(12) United States Patent
Kim et al.

(10) Patent No.: US 11,972,136 B2
(45) Date of Patent: *Apr. 30, 2024

(54) MEMORY SYSTEM AND METHOD OF OPERATING THE SAME

(71) Applicant: SAMSUNG ELECTRONICS CO., LTD., Suwon-si (KR)

(72) Inventors: Hyun-Seok Kim, Seoul (KR); Dae-Ho Kim, Hwaseong-si (KR); Yong-Geun Oh, Ansan-si (KR); Sung-Jin Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,948

(22) Filed: Oct. 12, 2022

(65) Prior Publication Data
US 2023/0111732 A1 Apr. 13, 2023

Related U.S. Application Data

(63) Continuation of application No. 17/357,084, filed on Jun. 24, 2021, which is a continuation of application
(Continued)

(30) Foreign Application Priority Data

Apr. 17, 2014 (KR) .................... 10-2014-0046190

(51) Int. Cl.
*G06F 3/06* (2006.01)
*G06F 11/30* (2006.01)

(52) U.S. Cl.
CPC .......... *G06F 3/0653* (2013.01); *G06F 3/0616* (2013.01); *G06F 3/0634* (2013.01);
(Continued)

(58) Field of Classification Search
CPC .... G06F 3/0653; G06F 3/0616; G06F 3/0634; G06F 3/0659; G06F 3/0679; G06F 3/0688; G06F 11/3058
See application file for complete search history.

(56) References Cited

U.S. PATENT DOCUMENTS 6,507,530 B1 1/2003 Williams et al.
7,415,625 B2 8/2008 Wyatt et al.
(Continued)

FOREIGN PATENT DOCUMENTS

CN 101000509 7/2007
JP H0667910 3/1994
(Continued)

OTHER PUBLICATIONS

Chinese Office Action dated Apr. 4, 2018 for Chinese Patent Application No. 201510179610.7.
(Continued)

*Primary Examiner* — Michelle T Bechtold
(74) *Attorney, Agent, or Firm* — F. Chau & Associates, LLC

(57) ABSTRACT

A method of operating a memory system, which includes a memory controller and at least one non-volatile memory, includes storing, in the memory system, temperature-dependent performance level information received from a host disposed external to the memory system, setting an operation performance level of the memory system to a first performance level, operating the memory controller and the at least one non-volatile memory device according to the first performance level, detecting an internal temperature of the memory system, and changing the operation performance level of the memory system to a second performance level that is different from the first performance level. The operation performance level is changed by the memory controller of the memory system, and changing the opera-
(Continued)

tion performance level is based on the temperature-dependent performance level information and the detected internal temperature.

18 Claims, 18 Drawing Sheets

Related U.S. Application Data

No. 16/241,488, filed on Jan. 7, 2019, now Pat. No. 11,093,166, which is a continuation of application No. 14/601,552, filed on Jan. 21, 2015, now Pat. No. 10,198,214.

(52) U.S. Cl.
CPC .......... *G06F 3/0659* (2013.01); *G06F 3/0679* (2013.01); *G06F 3/0688* (2013.01); *G06F 11/3058* (2013.01)

(56) References Cited

U.S. PATENT DOCUMENTS

| | | | |
|---|---|---|---|
| 7,590,020 | B2 | 9/2009 | Lee |
| 7,733,595 | B2 | 6/2010 | Lucas et al. |
| 8,644,074 | B2 | 2/2014 | Chang et al. |
| 8,773,804 | B2 | 7/2014 | Auberbach et al. |
| 8,947,928 | B2 | 2/2015 | Kim et al. |
| 9,244,519 | B1* | 1/2016 | Ellis ...................... G06F 3/0634 |
| 10,198,214 | B2 | 2/2019 | Kim et al. |
| 2006/0164746 | A1 | 7/2006 | Son et al. |
| 2007/0140030 | A1 | 6/2007 | Wyatt |
| 2008/0103634 | A1 | 5/2008 | Santos et al. |
| 2009/0052266 | A1* | 2/2009 | Askar ................... G06F 13/161 |
| | | | 365/212 |
| 2009/0171513 | A1 | 7/2009 | Tsukazawa |
| 2010/0008151 | A1 | 1/2010 | Hwang |
| 2010/0180063 | A1 | 7/2010 | Ananny et al. |
| 2010/0268971 | A1 | 10/2010 | Poo et al. |
| 2011/0010487 | A1* | 1/2011 | Sadovsky ........... G06F 12/0246 |
| | | | 711/E12.001 |
| 2012/0023351 | A1 | 1/2012 | Wakrat et al. |
| 2012/0047320 | A1* | 2/2012 | Yoo ....................... G06F 3/0679 |
| | | | 711/E12.008 |
| 2012/0271482 | A1 | 10/2012 | Tsukazawa |
| 2012/0331207 | A1 | 12/2012 | Lassa et al. |
| 2013/0083794 | A1 | 4/2013 | Lakshmanamurthy et al. |
| 2013/0132650 | A1 | 5/2013 | Choi et al. |
| 2013/0145085 | A1* | 6/2013 | Yu ........................ G06F 12/0246 |
| | | | 711/103 |
| 2014/0101371 | A1 | 4/2014 | Nguyen et al. |
| 2015/0261281 | A1 | 9/2015 | Bickelman et al. |
| 2015/0301744 | A1 | 10/2015 | Kim et al. |
| 2019/0155538 | A1 | 5/2019 | Kim et al. |
| 2021/0326059 | A1 | 10/2021 | Kim et al. |

FOREIGN PATENT DOCUMENTS

| | | |
|---|---|---|
| JP | 2005-174203 | 6/2005 |
| JP | 2008-135110 | 6/2008 |
| JP | 2009-157829 | 7/2009 |
| JP | 2011-215855 | 10/2011 |
| KR | 1020060068946 | 6/2006 |
| KR | 1020070050151 | 5/2007 |
| KR | 10-1007160 | 1/2011 |
| KR | 1020110067675 | 6/2011 |
| KR | 1020110127481 | 11/2011 |
| KR | 10-2012-0125791 | 11/2012 |

OTHER PUBLICATIONS

Final Office Action dated May 31, 2018 in Corresponding U.S. Appl. No. 14/601,552.
Final Office Action dated Jun. 9, 2017 in Corresponding U.S. Appl. No. 14/601,552.
Final Office Action dated Jan. 10, 2020 in corresponding U.S. Appl. No. 16/241,488.
Final Office Action dated Nov. 13, 2020 in corresponding U.S. Appl. No. 16/241,488.
NOA dated Oct. 29, 2020 in Corresponding Korean Appln No. 10-2014-0046190.
Office Action dated May 14, 2020 in Corresponding U.S. Appl. No. 16/241,488.
Office Action dated Jul. 9, 2019 in Corresponding U.S. Appl. No. 16/241,488.
Office Action dated Oct. 27, 2017 in Corresponding U.S. Appl. No. 14/601,552.
Office Action dated Dec. 6, 2016 in Corresponding U.S. Appl. No. 14/601,552.
Official Communication dated May 15, 2020 in Related KR 10-2014-0046190 Application.
Office Action dated Jan. 9, 2023 in corresponding U.S. Appl. No. 17/357,084.
Office Action dated Jan. 19, 2023 in corresponding U.S. Appl. No. 17/357,084.

* cited by examiner

MEMORY SYSTEM AND METHOD OF OPERATING THE SAME

CROSS-REFERENCE TO RELATED APPLICATIONS

This application is a continuation application of U.S. patent application Ser. No. 17/357,084 filed Jun. 24, 2021, which is a continuation application of U.S. patent application Ser. No. 16/241,488 filed Jan. 7, 2019, issued as U.S. Pat. No. 11,093,166 on Aug. 17, 2017, which is a continuation application of U.S. patent application Ser. No. 14/601,552 filed Jan. 21, 2015, issued as U.S. Pat. No. 10,198,166 on Feb. 5, 2019, which claims the benefit of Korean Patent Application No. 10-2014-0046190, filed on Apr. 17, 2014, the disclosures of which are incorporated by reference herein in their entireties.

TECHNICAL FIELD

Exemplary embodiments of the present inventive concept relate to a memory system and a method of operating the same, and more particularly, to a memory system capable of controlling operation performance in a stepwise manner according to a temperature detection result, and a method of operating the same.

DISCUSSION OF THE RELATED ART

Memory systems may be generally classified into volatile memory systems and non-volatile memory systems. Non-volatile memory retains data stored therein even when powered off, whereas volatile memory loses data when powered off. Examples of non-volatile memory include a read only memory (ROM), a magnetic disk, an optical disk, a flash memory, a resistance random-access memory (RRAM), a phase-change random-access memory (PRAM), and a magnetic random-access memory (MRAM). A flash memory refers to a memory that stores data according to a change in a threshold voltage of a metal-oxide semiconductor (MOS) transistor, and may include, for example, NAND and NOR flash memories.

When the memory system operates at a high performance level, an internal temperature of the memory system increases, which may result in the malfunction of internal elements of the memory system or damage to the internal elements.

SUMMARY

Exemplary embodiments of the inventive concept provide a memory system capable of preventing internal elements thereof from being damaged due to an increase in temperature, and a method of operating the same.

According to an exemplary embodiment of the inventive concept, a method of operating a memory system, which includes a memory controller and a memory device, includes storing, in the memory system, temperature-dependent performance level information received from an external location (e.g., from a host), setting an operation performance level of the memory system to a first performance level, detecting an internal temperature of the memory system, and throttling the performance level of the memory system to a second performance level based on the temperature-dependent performance level information under control of the memory controller according to a temperature detection result, regardless of external control by the host.

The temperature-dependent performance level information may include table information that includes information relating to performance levels corresponding to a plurality of temperature ranges.

The temperature-dependent performance level information may be received from the host during booting or a run-time operation of the memory system.

The method may further include storing a detected temperature value as current temperature information, and updating current performance level information with performance level information corresponding to the detected temperature value.

A frequency of an internal clock of the memory system may be changed based on the temperature-dependent performance level information.

A delay of a first confirm command corresponding to a first command received from the host may be changed based on the temperature-dependent performance level information.

The memory system may include a plurality of memory chips, and a number of memory chips to be simultaneously accessed from among the plurality of memory chips may be changed based on the temperature-dependent performance level information.

The method may further include transmitting current performance level information in response to a request from the host, receiving performance setting information from the host, and performing a memory operation at a performance level based on the performance setting information regardless of the temperature-dependent performance level information stored in the memory system.

The memory system may include a solid state drive (SSD) or a memory card.

The temperature-dependent performance level information may include time information corresponding to temperature ranges, and the operation performance level of the memory system may be throttled to the second performance level based on time information corresponding to a specific temperature range, when the internal temperature of the memory system remains in the specific temperature range for a predetermined time.

According to an exemplary embodiment of the inventive concept, a method of operating a memory system, which includes a memory controller and a memory device, includes transmitting first information relating to a temperature of the memory system in response to receiving a first command, receiving and storing first performance level information associated with the first information, performing an operation of the memory system at a first performance level corresponding to the first performance level information, transmitting second information relating to the temperature of the memory system in response to receiving the first command, receiving and storing second performance level information associated with the second information, and performing an operation of the memory system at a second performance level corresponding to the second performance level information.

The first command may be a read command or a write command.

The first command may be a command that is prearranged between the memory system and a host, regardless of the operation of the memory system.

A delay in transmitting a confirm command from the memory system to a host may be changed according to the first performance level and the second performance level.

The method may further include updating the first information in a memory with the second information according to a change in temperature, and updating the first performance level information in the memory with the second performance level information according to the change in temperature.

According to an exemplary embodiment of the inventive concept, a method of operating a memory system, which includes a memory controller and at least one non-volatile memory device, includes storing, in the memory system, temperature-dependent performance level information received from a host disposed external to the memory system, setting an operation performance level of the memory system to a first performance level, operating the memory controller and the at least one non-volatile memory device according to the first performance level, detecting an internal temperature of the memory system, and changing the operation performance level of the memory system to a second performance level that is different from the first performance level. The operation performance level is changed by the memory controller of the memory system, and changing the operation performance level is based on the temperature-dependent performance level information and the detected internal temperature.

According to an exemplary embodiment of the inventive concept, a method of operating a memory system, which includes a memory controller and at least one non-volatile memory device, includes transmitting first information relating to a temperature of the memory system in response to receiving a first command at the memory system, receiving and storing first performance level information associated with the first information in the memory system, performing a first operation of the memory system at a first performance level corresponding to the first performance level information, transmitting second information relating to the temperature of the memory system in response to receiving the first command at the memory system, receiving and storing second performance level information associated with the second information in the memory system, and performing a second operation of the memory system at a second performance level corresponding to the second performance level information.

According to an exemplary embodiment of the inventive concept, a memory system includes a memory controller configured to control at least one non-volatile memory device. The memory controller includes a performance table configured to store temperature-dependent performance level information received from a host disposed external to the memory system, and a temperature sensor configured to detect an internal temperature of the memory system. An operation performance level of the memory system is changed from a first performance level to a second performance level, different from the first performance level, by the memory controller based on the temperature-dependent performance level information stored in the performance table and the internal temperature detected by the temperature sensor.

According to an exemplary embodiment of the inventive concept, a memory system includes a memory controller configured to control at least one non-volatile memory device. The memory controller includes a temperature sensor configured to detect an internal temperature of the memory system, and a storage unit configured to store internal temperature information of the memory system and performance level information corresponding to the internal temperature information. The memory controller is configured to transmit, to a host disposed external to the memory system, the internal temperature information detected by the temperature sensor in response to receiving a first command from the host, store first performance level information corresponding to the internal temperature information in the storage unit, and perform a memory system operation at a first performance level corresponding to the first performance level information.

According to an exemplary embodiment of the inventive concept, a method of operating a memory system, which includes a memory controller and at least one non-volatile memory device, includes receiving, at the memory system, temperature-dependent performance level information from a host disposed external to the memory system, setting an operation performance level of the memory system to a first performance level, operating the memory controller and the at least one non-volatile memory device according to the first performance level, detecting an internal temperature of the memory system, and throttling the operation performance level of the memory system to a second performance level that is lower than the first performance level based on the temperature-dependent performance level information and the detected internal temperature without intervention from the host.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
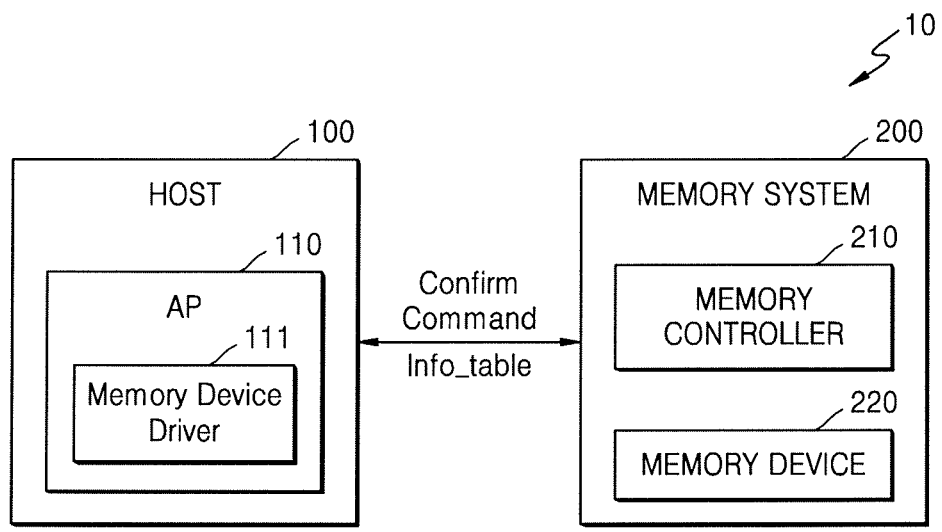
FIG. 1 is a block diagram illustrating an implementation of a data processing system including a memory system, according to an exemplary embodiment of the inventive concept.

Exemplary embodiments of the present inventive concept will be described more fully hereinafter with reference to the accompanying drawings. Like reference numerals may refer to like elements throughout the accompanying drawings. In the drawings, the dimensions of structures may be exaggerated for clarity. As used herein, the term "and/or" includes any and all combinations of one or more of the associated listed items.

FIG. 1 is a block diagram illustrating an implementation of a data processing system including a memory system, according to an exemplary embodiment of the inventive concept. Referring to FIG. 1, the data processing system 10 may include a host 100 and a memory system 200. The memory system 200 shown in FIG. 1 may be utilized in various systems that include a data processing function. The various systems may be various devices including, for example, mobile devices, such as a smartphone or a tablet computer. However, the various devices are not limited thereto.

The memory system 200 may include various types of memory devices. Herein, exemplary embodiments of the inventive concept will be described as including a memory device that is a non-volatile memory, however, exemplary embodiments are not limited thereto. For example, the memory system 200 may include a memory device that is a volatile memory.

According to exemplary embodiments, the memory system 200 may include a non-volatile memory device such as, for example, a read-only memory (ROM), a magnetic disk, an optical disk, a flash memory, etc. The flash memory may be a memory that stores data according to a change in a threshold voltage of a metal-oxide-semiconductor field-effect transistor (MOSFET), and may include, for example, NAND and NOR flash memories. The memory system 200 may be implemented using a memory card including a non-volatile memory device such as, for example, an embedded multimedia card (eMMC), a secure digital (SD) card, a micro SD card, or a universal flash storage (UFS), or the memory system 200 may be implemented using, for example, an SSD including a non-volatile memory device. Herein, the configuration and operation of the memory system 200 will be described assuming that the memory system 200 is a non-volatile memory system, however, the memory system 200 is not limited thereto. The host 100 may include, for example, a system-on-chip (SoC) application processor (AP) mounted on, for example, a mobile device, or a central processing unit (CPU) included in a computer system.

As described above, the host 100 may include an AP 110. The AP 110 may include various intellectual property (IP) blocks. For example, the AP 110 may include a memory device driver 111 that controls the non-volatile memory system 200. The host 100 may communicate with the non-volatile memory system 200 to transmit a command related to a memory operation and receive a confirm command in response to the transmitted command.

The non-volatile memory system 200 may include, for example, a memory controller 210 and a memory device 220. The memory controller 210 may receive a command related to a memory operation from the host 100, generate an internal command and an internal clock signal using the received command, and provide the internal command and the internal clock signal to the memory device 220. The memory device 220 may store write data in a memory cell array in response to the internal command, or may provide read data to the memory controller 210 in response to the internal command.

The memory device 220 includes a memory cell array that retains data stored therein, even when the memory device 220 is not powered on. The memory cell array may include as memory cells, for example, a NAND or NOR flash memory, a magnetoresistive random-access memory (MRAM), a resistive random-access memory (RRAM), a ferroelectric access-memory (FRAM), or a phase change memory (PCM). For example, when the memory cell array includes a NAND flash memory, the memory cell array may include a plurality of blocks and a plurality of pages. Data may be programmed and read in units of pages, and data may be erased in units of blocks.

According to an exemplary embodiment of the inventive concept, information relating to temperature and/or performance may be transmitted and received between the host 100 and the non-volatile memory system 200 using an in-band command. According to an exemplary embodiment of the present invention, performance setting information allowing the host 100 to throttle a performance level (hereinafter also referred to as a system performance level or an operation performance level) of the non-volatile memory system 200 may be transmitted and received. As an example, upon initial operation of the data processing system 10 (e.g., during a boot-up operation of the system), the host 100 may provide the non-volatile memory system 200 with table information Info_table including, for example, temperature-dependent system performance information. The non-volatile memory system 200 may receive and store the table information Info_table. Alternatively, during a run-time operation of the data processing system 10, the table information Info_table may be provided by the host 100 to the non-volatile memory system 200. In an exemplary embodiment, the non-volatile memory system 200 may include a volatile memory such as, for example, a dynamic random-access memory (DRAM) or a static random-access memory (SRAM), and the table information Info_table may be stored in the volatile memory.

The table information Info_table may include a variety of information. For example, the table information Info_table may include temperature information and temperature-dependent performance level information, and may also include time information, which may be the criteria for changing a performance level. The temperature information may be divided into a plurality of temperature ranges. When the internal temperature range of the non-volatile memory system 200 changes, the performance level of the non-volatile memory system 200 may be throttled accordingly.

During a memory operation, the non-volatile memory system 200 may periodically detect an internal temperature thereof and throttle a system performance level based on the table information Info_table according to the detection result. In addition, in response to receiving a predetermined command from the host 100, the non-volatile memory system 200 may provide the host 100 with current internal temperature information of the non-volatile memory system 200 and performance level information of the non-volatile memory system 200. The internal temperature information and the performance level information of the memory system 200 may be provided in response to various commands such as, for example, a general memory command (e.g., a read or write command), or a specific command prearranged between the host 100 and the non-volatile memory system 200.

As the non-volatile memory system 200 operates at a relatively high performance level, the internal temperature of the non-volatile memory system 200 may increase. In this case, the system performance level may be decreased based on the table information Info_table, thereby causing a decrease in the internal temperature of the non-volatile memory system 200. The temperature detection operation is performed periodically. When the internal temperature of the non-volatile memory system 200 is decreased, the non-volatile memory system 200 may increase the system performance level based on the table information Info_table. The table information Info_table may include a plurality of temperature ranges and information relating to system performance levels corresponding to the temperature ranges. The non-volatile memory system 200 may automatically change (e.g., throttle) the system performance level regardless of the control of the host 100. That is, the non-volatile memory system 200 may automatically change (e.g., throttle) the system performance level (e.g., under the control of the memory controller 210) on its own without intervention from the host 100.

Figure 2:
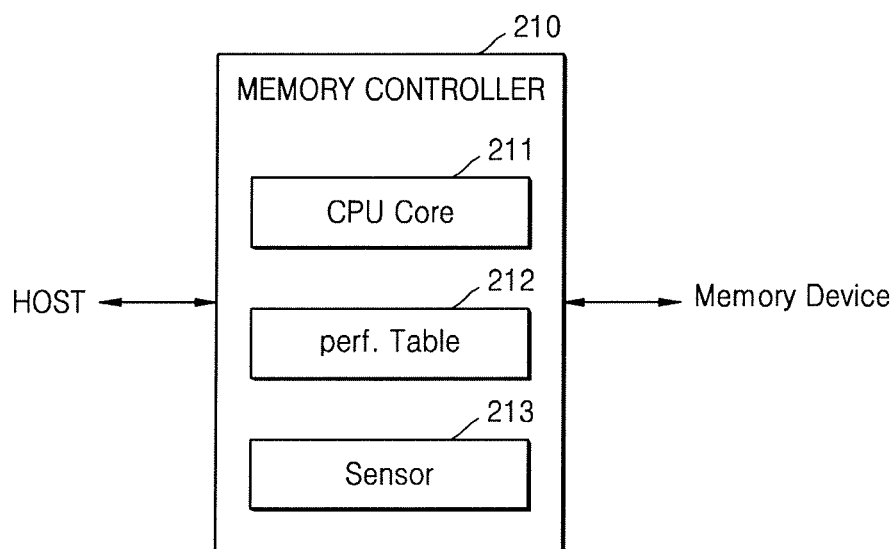
FIG. 2 is a block diagram illustrating an implementation of a memory controller of FIG. 1, according to an exemplary embodiment of the inventive concept.

FIG. 2 is a block diagram illustrating an implementation of the memory controller 210 of FIG. 1, according to an exemplary embodiment of the inventive concept.

Referring to FIG. 2, the memory controller 210 may include, for example, a CPU core 211, a performance table 212, and a sensor 213. The CPU core 211 may control the overall operation of the memory controller 210 and control transmission and reception of the command and the confirm command communicated between the memory controller 210 and the host 100. In addition, the CPU core 211 may control transmission and reception of an internal command, an address, and data communicated between the memory device 220 and the host 100 to control a memory operation corresponding to a command received from the host 100.

The performance table 212 may store the table information Info_table provided by the host 100 when the memory system 200 is initially driven. As described above, the table information Info_table may be provided by the host 100 to the memory system 200 when the memory system 200 is initially driven. The performance table 212 may include a volatile memory such as, for example, a DRAM or an SRAM. The table information Info_table may include temperature-dependent performance level information. For example, the table information Info_table may include information relating to a plurality of temperature ranges and information relating to system performance levels corresponding to the temperature ranges. The table information Info_table may be referred to by the CPU core 211, and the system performance level may be automatically throttled according to a detection result of the internal temperature of the memory system 200 and a result of referencing the table information Info_table.

The sensor 213 may include sensors that detect one or more pieces of information. For example, the sensor 213 may include a temperature sensor that detects an internal temperature of the memory system 200 and a timer that measures time. The table information Info_table may include temperature information, performance level information, and time information. For example, in order to throttle the system performance level when the internal temperature of the memory system 200 remains within a specific temperature range for a predetermined time, time information corresponding to each of the temperature ranges may be included in the table information Info_table. For example, when the internal temperature of the memory system 200 is in the range of about to about 70° C., the memory system 200 operates at a first performance level. In this case, when the internal temperature of the memory system 200 remains in the range of about 70° C. to about 80° C. for a predetermined time, the system performance level may be throttled to a second performance level lower than the first performance level.

Figure 3:
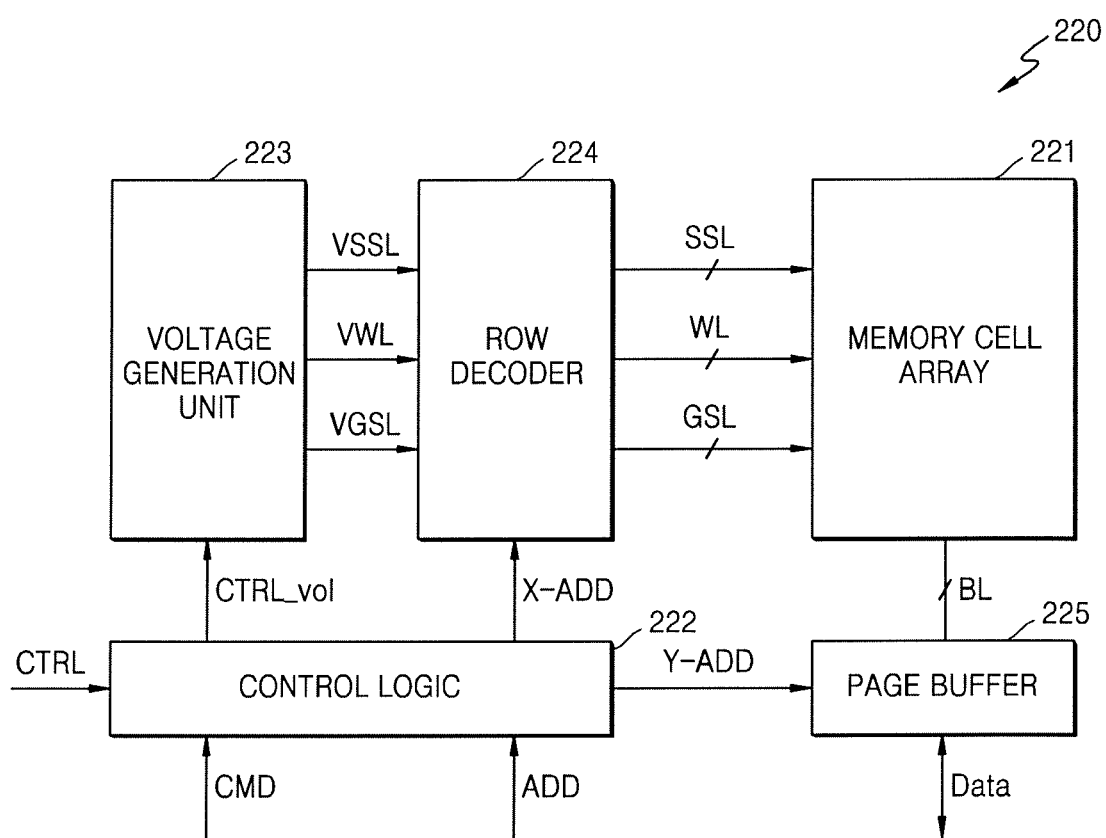
FIG. 3 is a detailed block diagram of a non-volatile memory device of FIG. 1, according to an exemplary embodiment of the inventive concept.

FIG. 3 is a detailed block diagram of the non-volatile memory device 220 of FIG. 1, according to an exemplary embodiment of the inventive concept.

Referring to FIG. 3, the non-volatile memory device 220 may include, for example, a memory cell array 221, a control logic 222, a voltage generation unit 223, a row decoder 224, and a page buffer 225.

The memory cell array 221 may be connected to one or more string select lines SSL, a plurality of word lines WL, one or more ground select lines GSL, and a plurality of bit lines BL. The memory cell array 221 may include a plurality of memory cells disposed at intersections between the plurality of word lines WL and the plurality of bit lines BL.

The control logic 222 may receive a command CMD (e.g., an internal command) and an address ADD from the memory controller 210 and receive a control signal CTRL for controlling various functional blocks within the non-volatile memory device 220 from the memory controller 210. The control logic 222 may output various control signals for writing data to the memory cell array 221 or reading data from the memory cell array 221, based on the command CMD, the address ADD, and the control signal CTRL. In this manner, the control logic 222 may control the overall operation of the memory device 220.

The various control signals output by the control logic 222 may be provided to the voltage generation unit 223, the row decoder 224, and the page buffer 225. For example, the control logic 222 may provide the voltage generation unit 223 with a voltage control signal CTRL_vol, provide the row decoder 224 with a row address X-ADD, and provide the page buffer 225 with a column address Y-ADD.

The voltage generation unit 223 may generate various voltages for performing program, read, and erase operations on the memory cell array 221 based on the voltage control signal CTRL_vol. For example, the voltage generation unit 223 may generate a first driving voltage VWL for driving the plurality of word lines WL, a second driving voltage VS SL for driving the plurality of string select lines SSL, and a third driving voltage VGSL for driving the plurality of ground select lines GSL. In this case, the first driving voltage VWL may be a program voltage (e.g., a write voltage), a read voltage, an erase voltage, a pass voltage, or a program verify voltage. In addition, the second driving voltage VSSL may be a string select voltage (e.g., an on voltage or an off voltage). Further, the third driving voltage VGSL may be a ground select voltage (e.g., an on voltage or an off voltage).

The row decoder 224 may be connected to the memory cell array 221 through the plurality of word lines WL, and may activate a part of the plurality of word lines WL in response to the row address X-ADD received from the control logic 222. For example, in a read operation, the row decoder 224 may apply a read voltage to a selected word line and a pass voltage to unselected word lines.

In a program operation, the row decoder 224 may apply a program voltage to a selected word line and a pass voltage to unselected word lines. In an exemplary embodiment, in at least one of a plurality of program loops, the row decoder 224 may apply the program voltage to the selected word line and an additionally selected word line.

The page buffer 225 may be connected to the memory cell array 221 through the plurality of bit lines BL. For example, in a read operation, the page buffer 225 may operate as a sense amplifier that outputs data stored in the memory cell array 221. Alternatively, in a program operation, the page buffer 225 may operate as a write driver that writes desired data to the memory cell array 221.

Figure 4:
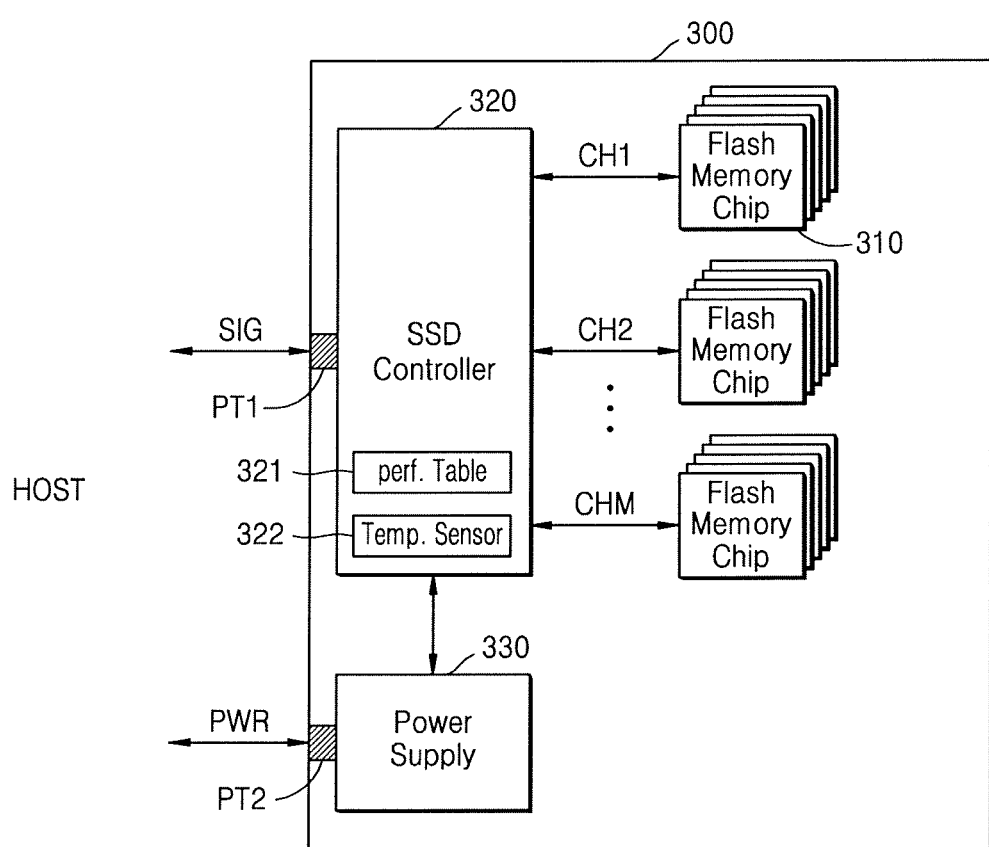
FIG. 4 is a block diagram illustrating an example in which the non-volatile memory system of FIG. 1 is implemented using a solid state drive (SSD), according to an exemplary embodiment of the inventive concept.

FIG. 4 is a block diagram illustrating an example in which the non-volatile memory system 200 of FIG. 1 is implemented using an SSD, according to an exemplary embodiment of the inventive concept. Referring to FIG. 4, the SSD 300 may include, for example, a plurality of flash memory chips 310, an SSD controller 320, and a power supply 330.

The SSD controller 320 may control the flash memory chips 310 in response to a signal SIG received from the host 100 through a first port PT1. The SSD controller 320 may be connected to the flash memory chips 310 through a plurality of channels CH1 to CHM. The SSD 300 may include the power supply 330 that receives power PWR from the host 100 through a second port PT2. In this case, the power supply 330 may be an auxiliary power supply. It is to be understood that exemplary embodiments of the inventive concept are not limited to the above-described example. For example, the SSD 300 may be supplied with power from external devices other than the host 100. The SSD 300 may output a signal SIG, which is generated as a result of processing a request from the host 100, through the first port PT1.

In the SSD 300 of FIG. 4, the SSD controller 320 may include a performance table 321 and one or more sensors 322, as described above. In an exemplary embodiment, one or more temperature sensors are provided as the one or more sensors 322. When the SSD 300 is initially driven, the SSD 300 may receive table information, including temperature-dependent performance level information, from the host 100. The table information may be stored in the performance table 321 of the SSD controller 320. During operation of the SSD 300, an internal temperature of the system (e.g., the memory system 200) may be periodically detected, and it may be detected whether the temperature remains in a predetermined range for a predetermined amount of time. According to the detection result, the system performance level of the SSD 300 may be throttled based on the table information.

Figure 5:
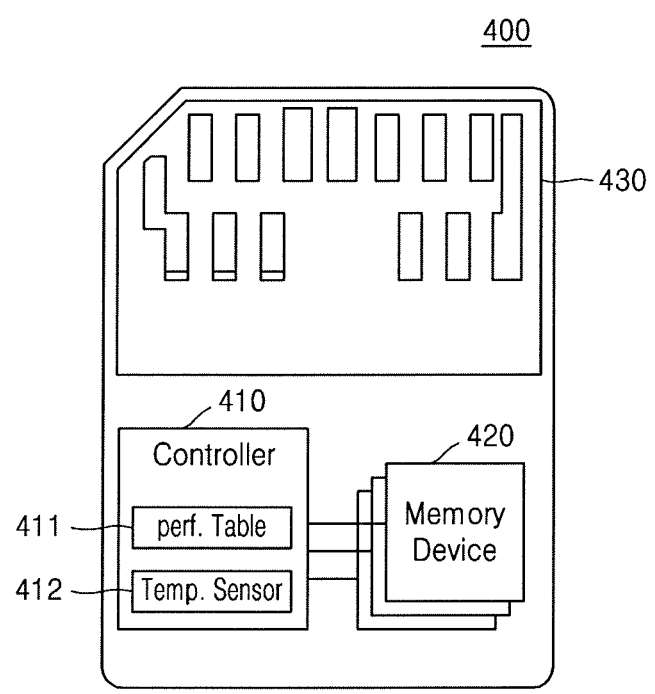
FIG. 5 is a block diagram illustrating an example in which the non-volatile memory system of FIG. 1 is implemented using a memory card, according to an exemplary embodiment of the inventive concept.

FIG. 5 is a block diagram illustrating an example in which the non-volatile memory system 200 of FIG. 1 is implemented using a memory card 400, according to an exemplary embodiment of the inventive concept. The memory card 400 may be, for example, a portable storage device that is connectable to an electronic device, such as a mobile device or a desktop computer. Referring to FIG. 5, the memory card 400 may include, for example, a memory controller 410, a non-volatile memory device 420, and a connection interface 430.

The memory card 400 may communicate with an external host through the connection interface 430. The memory controller 410 may control the non-volatile memory device 420. The memory controller 410 may read a program from a ROM that stores programs and may execute a control function.

As in the above-described exemplary embodiments, the memory controller 410 may include a performance table 411 and one or more temperature sensors 412. When the memory controller 410 is initially driven, the memory controller 410 may receive table information, including temperature-dependent performance level information, from the host 100. The table information may be stored in the performance table 411 of the memory controller 410. The memory card 400 may throttle a system performance level of the memory card 400 based on the table information according to a result obtained by periodically detecting an internal temperature of the non-volatile memory system 420 at different times.

Figure 6:
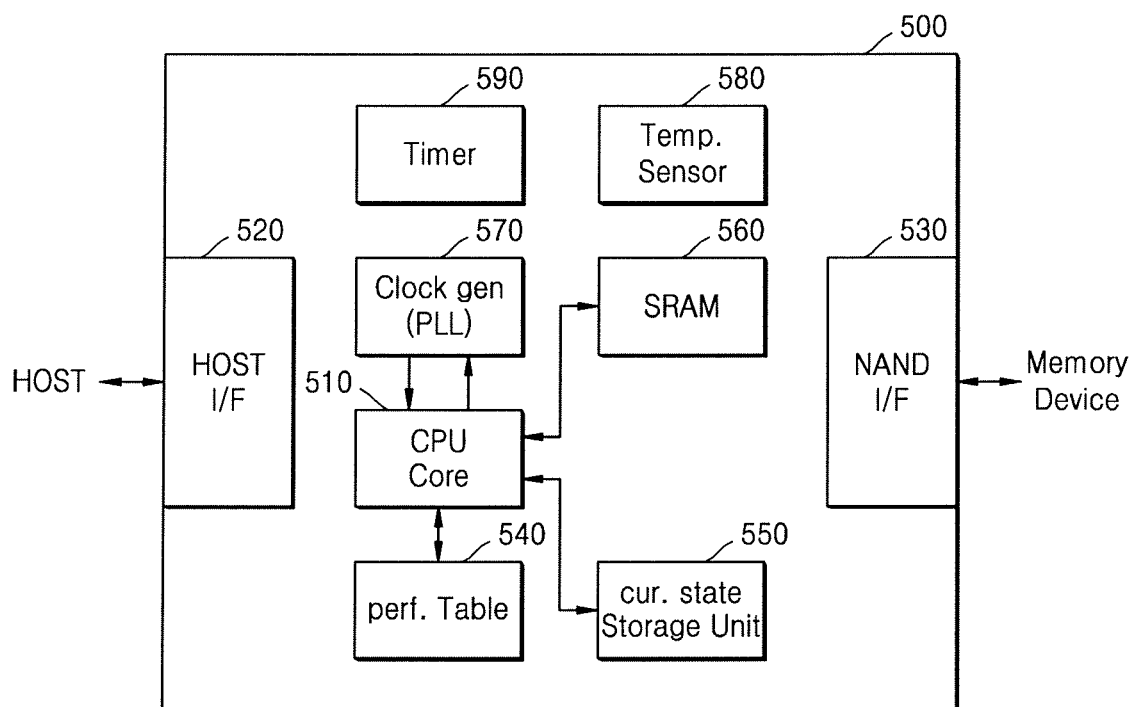
FIG. 6 is a block diagram of a memory controller included in a non-volatile memory system, according to an exemplary embodiment of the inventive concept.

FIG. 6 is a block diagram of a memory controller 500 included in a non-volatile memory system, according to an exemplary embodiment of the inventive concept.

Referring to FIG. 6, the memory controller 500 may include, for example, a CPU core 510, a host interface 520, and a memory interface 530. As described above, the CPU core 510 may control the overall operation of the memory controller 500, and the host interface 520 may communicate with the host 100 through a predetermined protocol. For example, the protocol may be an embedded multimedia card (eMMC) protocol, an SD protocol, a serial advanced technology attachment (SATA) protocol, a serial attached small computer system interface (SCSI) (SAS) protocol, a non-volatile memory express (NVMe) protocol, or a universal serial bus (USB) protocol. In addition to the above protocols, various other protocols may also be used. The memory interface 530 may transmit a control signal, a physical address, user data, etc. to the non-volatile memory device, and receive data from the non-volatile memory device corresponding to a request given to the non-volatile memory device. An example in which the non-volatile memory device is a NAND flash memory is illustrated in FIG. 6.

According to an exemplary embodiment of the inventive concept, the memory controller 500 may further include a performance table 540, a current state storage unit 550, a volatile memory 560, a clock generation unit 570, a temperature sensor 580, and a timer 590. Although an SRAM is illustrated as the volatile memory 560 in FIG. 6, exemplary embodiments are not limited thereto. For example, another volatile memory, such as a DRAM, may also be used. The performance table 540 and the current state storage unit 550 may include a storage unit that stores performance level information (e.g., a volatile memory, such as a DRAM or an SRAM as described above).

The performance table 540 may store performance level information transmitted from the host 100 in an initial operation of the non-volatile memory system. In a manner identical or similar to the above-described exemplary embodiments, the table information may be received from the host 100 and stored in the performance table 540. The table information may include performance level information corresponding to a plurality of temperature ranges, and time information used as a temporal reference value for changing a performance level. The current state storage unit 550 may store current temperature information detected by the temperature sensor 580 and currently set performance level information.

The volatile memory 560 may store a variety of information related to driving the system. For example, when the non-volatile memory system is driven, system operation information having been stored in a non-volatile memory may be stored in the volatile memory 560. In addition, information for archiving a current performance level (e.g., latency information for transmitting signals to the host and receiving signals from the host) may be set in the volatile memory 560 by the CPU core 510.

The clock generation unit 570 may include a phase locked loop (PLL) and may generate a clock signal that is used for a memory control operation in the memory controller 500, however the clock generation unit 570 is not limited thereto. The clock generation unit 570 may generate a clock signal that is provided to the memory device for transmitting signals to the memory device and receiving signals from the memory device. According to temperature information detected by the temperature sensor 580, a frequency of the clock signal generated by the clock generation unit 570 may be changed. For example, when the memory system including the memory controller 500 operates at a high performance level, the internal temperature of the memory system may increase. In this case, the internal temperature of the memory system may be decreased by lowering the performance level of the memory system. For example, the performance level may be lowered by reducing the frequency of the clock signal generated by the clock generation unit 570. Alternatively, as described above, the timer 590 may be used to detect whether the current temperature remains within a predetermined range for a predetermined amount of time.

Figure 7A:
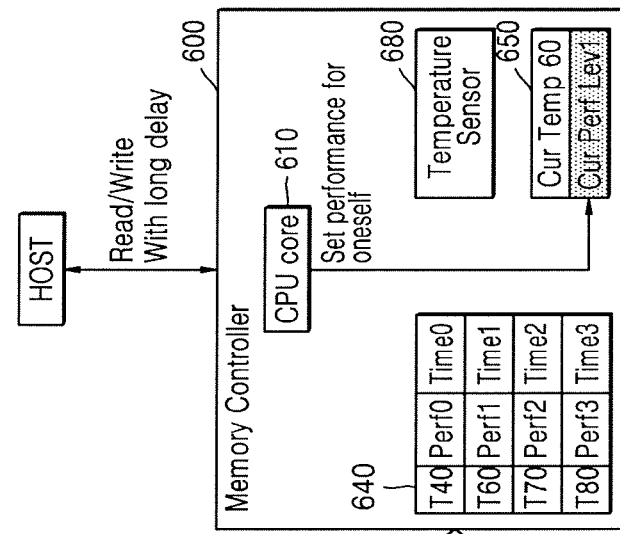
FIGS. 7A to 7C are block diagrams illustrating an example of a performance level throttling operation of a memory controller, according to an exemplary embodiment of the inventive concept.
Figure 7B:
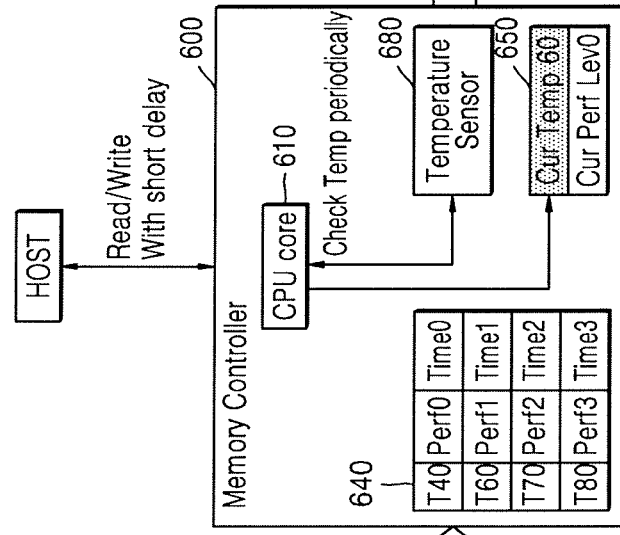
Figure 7C:
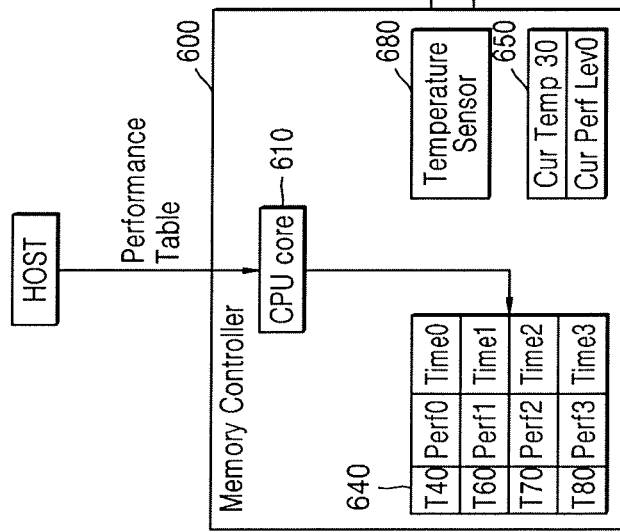

The operation of the memory system according exemplary embodiments of the inventive concept will be described in detail below. FIGS. 7A to 7C are block diagrams illustrating an example of a performance level throttling operation of a memory controller 600.

Referring to FIG. 7A, table information, including temperature-dependent performance level information, may be provided by the host to the memory controller 600 in an initial operation of the memory system. A performance table 640 of the memory controller 600 may store the received table information. The table information, temperature information, performance level information, and time information may be stored in the performance table 640.

Referring to FIG. 7A, when a temperature is in a first temperature range (e.g., lower than T40) and remains in the first temperature range for a first time Time0, the performance level may be set to be a first level Perf0. When a temperature is in a second temperature range (e.g., lower than T60) and remains in the second temperature range for a second time Time1, the performance level may be set to be a second level Perf1. Similarly, performance ranges corresponding to the temperature ranges may be set according to the table information stored in the performance table 640. In FIG. 7A, the times set for the different temperature ranges (e.g., Time0, Time1, Time2, Time3) may be the same or different from each other.

Thereafter, the memory system may operate normally, and the memory controller 600 may operate at a relatively high speed, as illustrated in FIG. 7B. Accordingly, a confirm command may be transmitted to the host with a short delay in response to a command from the host. In addition, during the normal operation of the memory system, the internal temperature of the memory system may be periodically or randomly detected by a temperature sensor 680. A CPU core 610 may update information stored in a current state storage unit 650 based on a detection result obtained using the temperature sensor 680. For example, information indicating a current internal temperature of the memory system may be updated in the current state storage unit 650. In an exemplary embodiment, when a temperature range to which the current internal temperature of the memory system belongs to is checked and the current internal temperature of the memory system remains within the checked temperature range for a predetermined amount of time, information stored in the current state storage unit 650 may be updated.

When the internal temperature of the memory system is detected as changing such that the internal temperature moves into another temperature range, the performance level information stored in the current state storage unit 650 may be updated as illustrated in FIG. 7C. For example, when the current temperature is equal to or lower than T60, the performance level may be set to the second level Perf1, the performance of which is relatively lower than the performance of the first level Perf0, based on the performance table 640, and relevant performance level information may be updated in the current state storage unit 650. The CPU core 610 may change (e.g., decrease/throttle) the system performance level based on the updated information in the current state storage unit 650 and provide a confirm command to the host with a relatively long delay in response to a command from the host.

Figure 8:
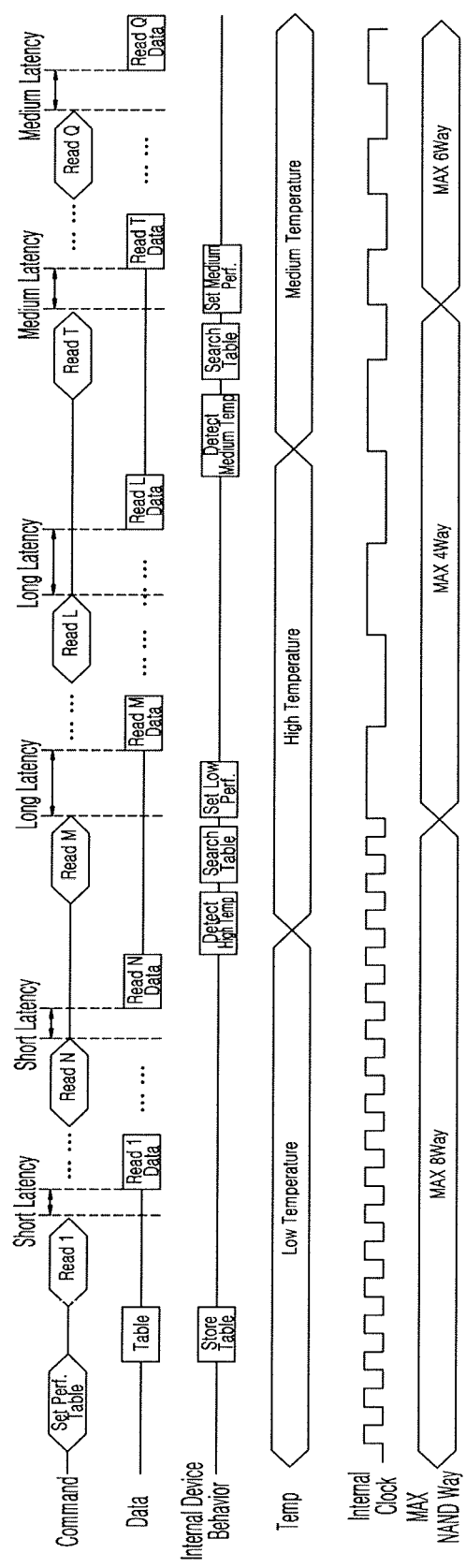
FIG. 8 is a waveform diagram illustrating an example of an operation of the memory controller of FIG. 7, according to an exemplary embodiment of the inventive concept.

FIG. 8 is a waveform diagram illustrating an example of the operation of the memory controller of FIG. 7, according to an exemplary embodiment of the inventive concept.

Referring to FIG. 8, when the memory system receives a command requesting the setting of table information including temperature-dependent performance level information in an initial operation of the memory system, the memory system stores the table information. Thereafter, when an internal temperature of the memory system is decreased, signals are transmitted and received with a short delay (latency) between the host and the memory system. A plurality of confirm commands Read1 Data to ReadN Data are transmitted to the host with a short delay (latency) in response to a plurality of commands Read1 to ReadN. An internal clock of the memory system may have a high frequency.

The number of memory chips to be simultaneously accessed from among a plurality of memory chips may be changed according to the performance level of the memory system. For example, as described with reference to the exemplary embodiment of FIG. 4, the memory system may include a plurality of memory chips. In the case of a high performance level, the number of memory chips to be simultaneously accessed may be increased. In the case of a low performance level, the number of memory chips to be simultaneously accessed may be decreased. In the example of FIG. 8, when the memory system operates at a high performance level, eight memory chips are simultaneously accessed.

Thereafter, the internal temperature of the memory system is detected. As the internal temperature of the memory system increases, a relatively high temperature is detected. The performance level information may be changed based on the temperature detection result and the table information. For example, information for lowering the performance level may be set. Therefore, signals are transmitted and received with a long delay (latency) between the host and the memory system. For example, a plurality of confirm commands ReadM Data to ReadL Data are transmitted to the host with a long delay (latency) in response to a plurality of commands ReadM to ReadL. An internal clock of the memory system may have a high frequency, and the number of memory chips to be simultaneously accessed may be decreased.

As the internal temperature of the memory system decreases, a relatively medium temperature is detected in the memory system. The performance level information may be changed based on the temperature detection result and the table information. For example, information for increasing the performance level to a medium level may be set. Therefore, a plurality of confirm commands ReadT Data to ReadQ Data are transmitted to the host with a medium delay (latency) in response to a plurality of commands ReadT to ReadQ. The internal clock of the memory system may have a medium frequency, and the number of memory chips to be simultaneously accessed may be increased to a medium number (e.g., six in the current example).

An operation of a memory system according to an exemplary embodiment of the inventive concept will be described below in detail. FIGS. 9A to 9D are block diagrams illustrating an example of a performance level throttling operation of a memory controller, according to an exemplary embodiment of the inventive concept.

Similar to the exemplary embodiment of FIGS. 7A to 7C, in the exemplary embodiment of FIGS. 9A to 9D, temperature information may be transmitted and received between a host and a memory system using an in-band command. In addition, performance setting information for setting a performance level of the memory system in cooperation with the host may be transmitted and received between the host and the memory system. According to the exemplary embodiment of FIGS. 9A to 9D, the performance level of the memory system may be changed (e.g., throttled) without utilization of a performance table.

Figure 9A:
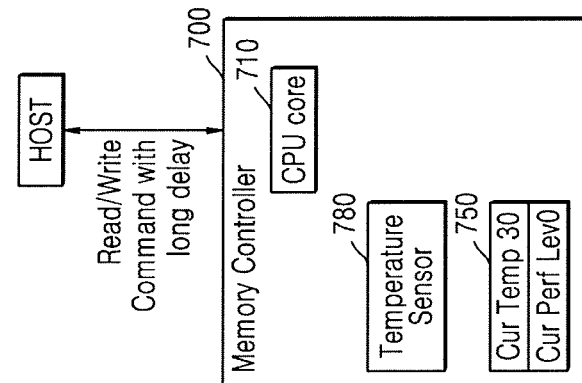
FIGS. 9A to 9D are block diagrams illustrating an example of a performance level throttling operation of a memory controller, according to an exemplary embodiment of the inventive concept.

Referring to FIG. 9A, the memory system is driven to perform a normal memory operation. A signal may be transmitted and received between a host and the memory system according to a predetermined performance level. For example, a current state storage unit 750 may store current temperature information and performance level information of the memory system. Based on the stored information, a signal transmitted and received between the host and the memory system corresponding to relatively high performance may be transmitted and received with a short delay.

Figure 9B:
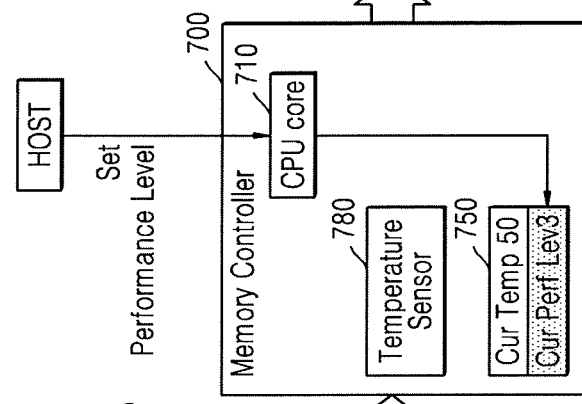

Referring to FIG. 9B, the host periodically or randomly transmits a command requesting the memory controller 700 to transmit internal temperature information of the memory system during the operation of the memory system. The command may be a command associated with a normal memory operation. For example, the command may be a read command or a write command. Alternatively, the command may be another command that is transmitted along with the read command or the write command. Alternatively, the command may be a specific command that is prearranged between the host and the memory system. In response to the specific command, the memory controller 700 may transmit temperature information to the host. When the specific command is received, current temperature information detected by a temperature sensor 780 may be updated in a current state storage unit 750 by a CPU core 710. In addition, the current temperature information may be provided to the host in response to a command from the host.

In a case in which the current temperature information is provided in response to a normal read command, the current temperature information may be provided to the host along with data corresponding to the read command. In a case in which the current temperature information is provided in response to a normal write command, the current temperature information may be provided to the host along with confirmation information indicating whether data is normally written in response to the write command. In a case in which the current temperature information is provided in response to a prearranged command, the current temperature information may be provided to the host through a separate channel between the host and the memory system.

Figures 9C, 9D:
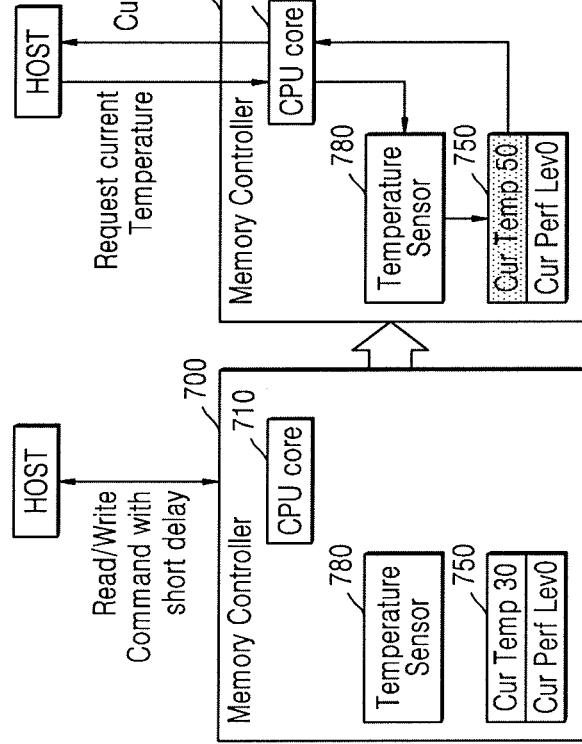

Referring to FIG. 9C, the host checks temperature information from the memory system and provides the memory controller 700 with performance setting information for changing (e.g., throttling) a performance level of the memory system. The performance setting information provided by the host may be updated in the current state storage unit 750 under the control of the CPU core 710. When an internal temperature of the memory system increases and relevant information is provided to the host, the host may provide the memory controller 700 with the performance setting information for lowering the performance level of the memory system, and the performance setting information may be updated in the current state storage unit 750. Referring to FIG. 9D, signals including various commands and data are transmitted and received with a relatively long delay between the host and the memory controller 700.

Figure 10:
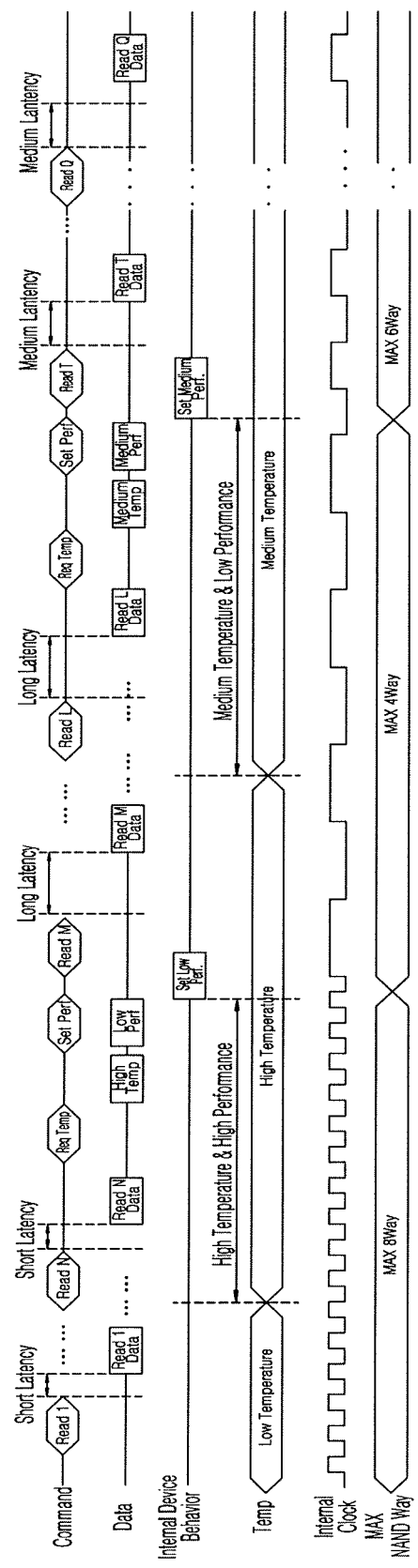
FIG. 10 is a waveform diagram illustrating an example of an operation of the memory controller of FIG. 9, according to an exemplary embodiment of the inventive concept.

FIG. 10 is a waveform diagram illustrating an example of the operation of the memory controller of FIG. 9, according to an exemplary embodiment of the inventive concept.

Referring to FIG. 10, when an internal temperature of the memory system is relatively low, signals are transmitted and received with a short delay (latency) between the host and the memory system. A plurality of confirm commands Read1 Data to ReadN Data are transmitted to the host with a short delay (latency) in response to a plurality of commands Read1 to ReadN. An internal clock of the memory system may have a high frequency. Since the memory system operates at a high performance level, the number of memory chips to be simultaneously accessed is relatively large. For example, eight memory chips may be simultaneously accessed in the current example.

Thereafter, the host may provide the memory system with a command for requesting transmission of temperature information, and the memory system may transmit a temperature detection result to the host in response to the command. The host may provide the memory system with performance setting information and a throttling command for throttling the performance level of the memory system based on the received temperature detection result, and the memory system may set the performance setting information such that a low performance level is set in response to the throttling command. Therefore, signals are transmitted and received with a long delay (latency) between the host and the memory system. For example, a plurality of confirm commands ReadM Data to ReadL Data are transmitted to the host with a long delay (latency) in response to a plurality of commands ReadM to ReadL. An internal clock of the memory system may have a low frequency, and the number of memory chips to be simultaneously accessed may be decreased (e.g., four memory chips may be simultaneously accessed in the current example). In this case, even when the internal temperature of the memory system is high, the memory system may still operate at a high performance level.

Alternatively, when the memory system is operating at a low performance level, the host may again provide the memory system with a command requesting transmission of the internal temperature information of the memory system. When the internal temperature of the memory system is in a medium temperature range, temperature information indicating the internal temperature of the memory system may be provided to the host. The host may provide the memory system with performance setting information for throttling the performance level of the memory system to a medium performance level and a command requesting the throttling of the performance level. Therefore, a plurality of confirm commands ReadT Data to ReadQ Data are transmitted to the host with a medium delay (latency) in response to a plurality of commands ReadT to ReadQ. An internal clock of the memory system may have a medium frequency, and the number of memory chips to be simultaneously accessed may be increased to a medium number (e.g., six in the current example).

Figure 11:
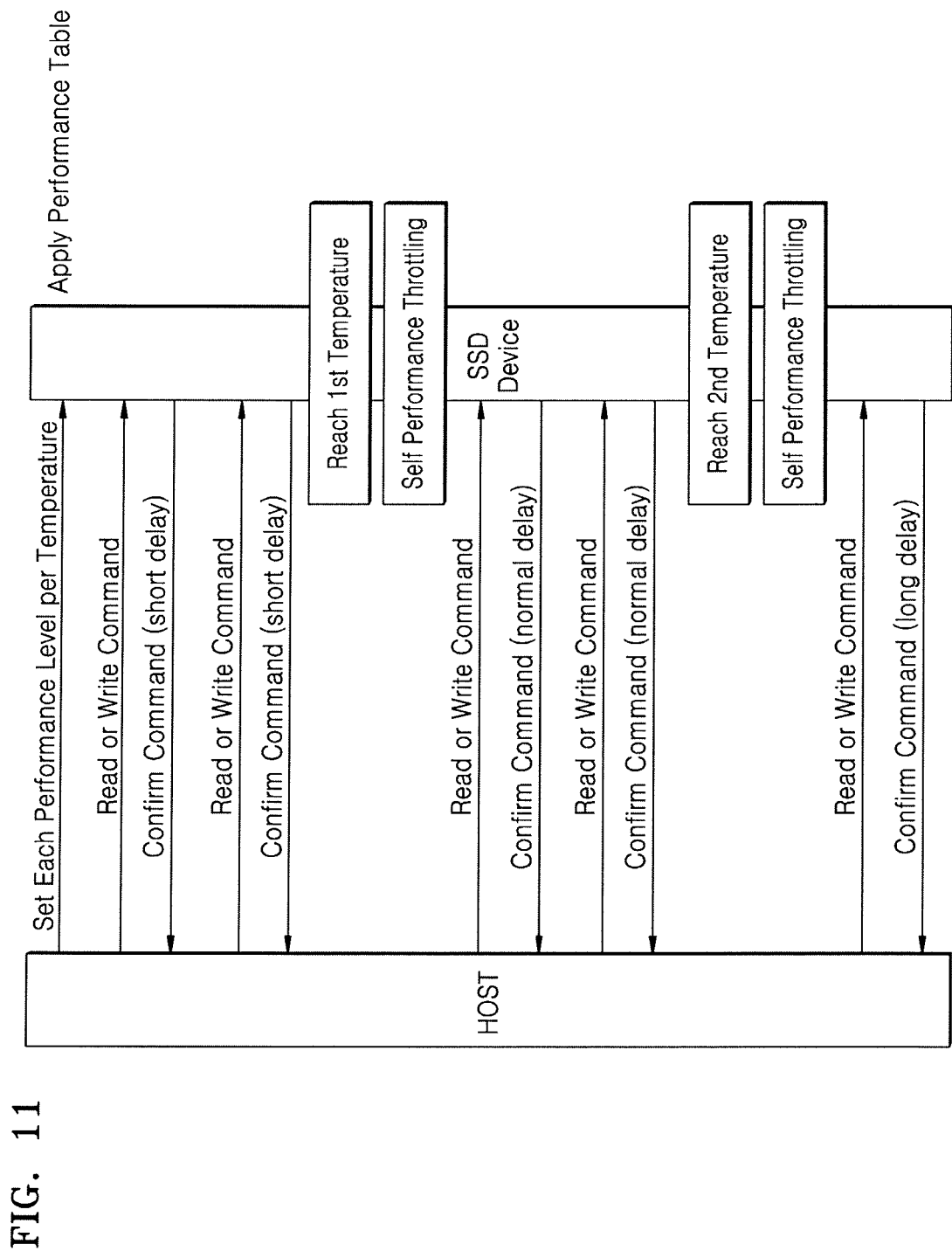
FIG. 11 is an operation flowchart of a memory system, according to an exemplary embodiment of the inventive concept.

FIG. 11 is an operation flowchart of a memory system, according to an exemplary embodiment of the inventive concept. FIG. 11 illustrates an example in which an SSD device is used as a memory system, however, exemplary embodiments are not limited thereto.

Referring to FIG. 11, in an initial operation of the memory system, table information is provided from a host to the memory system. The memory system may store the table information in an internal storage unit (e.g., a volatile memory). Thereafter, when the memory system operates normally, a read or write command is provided from the host to a memory controller. The memory system performs a memory operation at a predetermined performance level and provides the host with a result of the memory operation as a confirm command. When the memory system is determined to be operating at a relatively high performance level, the memory system provides the confirm command to the host after a short delay.

The internal temperature of the memory system is detected periodically or randomly, and the performance level of the memory system is throttled based on a temperature detection result. When it is detected that a current internal temperature has reached a relatively high temperature belonging to a first temperature range, the performance level of the memory system may be lowered according to the temperature detection result. For example, as in the above-described exemplary embodiment, when the current internal temperature remains in the first temperature range for a predetermined amount of time, the performance level of the memory system may be lowered.

According to the throttling of the performance level, a confirm command may be provided in response to a read or write command from the host. When the confirm command is provided, the relevant delay may be increased (e.g., the delay may be changed from a short delay to a normal delay). The internal temperature of the memory system is detected periodically or randomly. When it is detected that the current internal temperature reaches a relatively higher temperature belonging to a second temperature range, an operation of lowering the performance level of the memory system may be performed. After the operation of throttling the performance level, when a read or write command is received from the host, a confirm command may be provided to the host with a longer delay than before in response to the read or write command.

Figure 12:
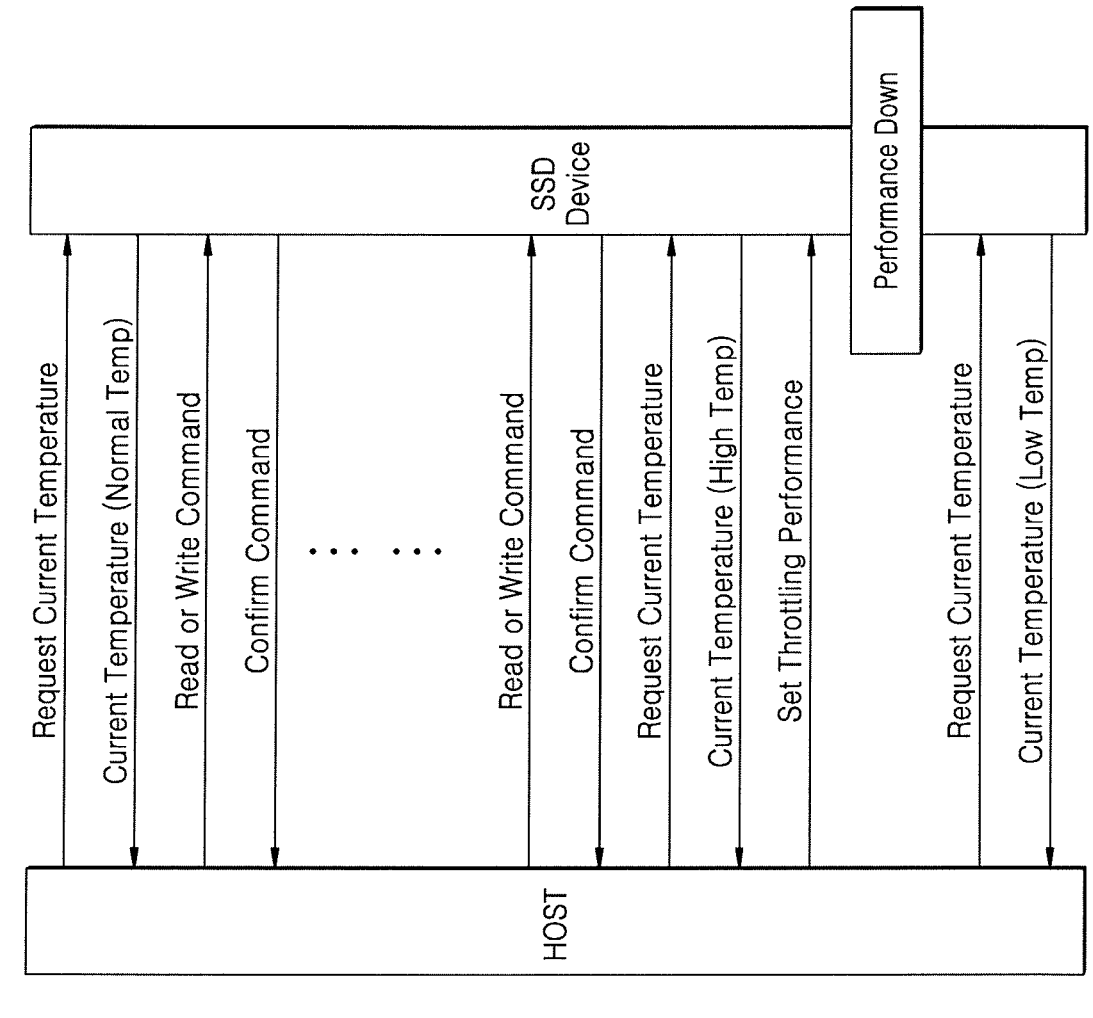
FIG. 12 is an operation flowchart of a memory system, according to an exemplary embodiment of the inventive concept.

FIG. 12 is an operation flowchart of a memory system, according to an exemplary embodiment of the inventive concept. FIG. 12 illustrates an example in which an SSD device is used as a memory system, however, exemplary embodiments are not limited thereto.

Referring to FIG. 12, when a specific command prearranged between a host and a memory system is provided to the memory system, transmission of current temperature information is requested. In response to the request, the memory system detects a current internal temperature of the memory system and transmits a detection result to the host. In the example described with reference to FIG. 12, it is assumed that the detected internal temperature of the memory system is in the normal temperature range.

Since the internal temperature of the memory system is in the normal temperature range, a confirm command is provided to the host at a normal performance level in response to a read or write command received from the host. Such a memory operation may be repeated. The host may periodically or randomly transmit a command to the memory system requesting transmission of current temperature information.

When the detected current internal temperature of the memory system is relatively high, the temperature information indicating the detected current temperature may be provided to the host. The host may provide the memory system with performance setting information for throttling the performance level of the memory system based on the temperature information. The memory system may store the performance setting information provided by the host and throttle the performance level of the memory system based on the performance setting information (e.g., without using the temperature-dependent performance level information stored in the memory system). For example, when the current temperature of the memory system is relatively high, the performance level of the memory system may be lowered. Thereafter, when a request for transmitting the temperature information is received from the host and the detected current temperature is relatively low, information indicating the current temperature may be provided to the host. The host may provide the memory system with performance setting information for increasing the performance level of the memory system.

Figure 13:
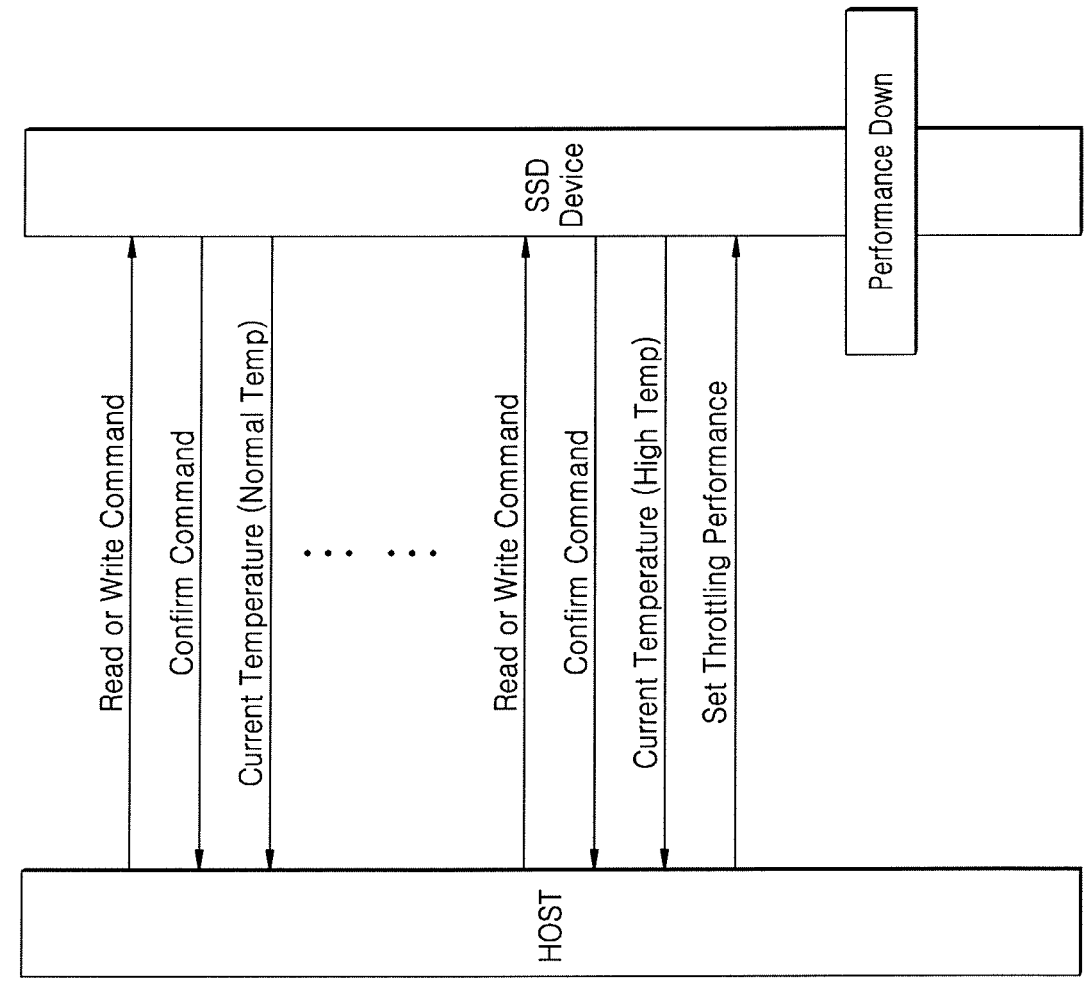
FIG. 13 is an operation flowchart of a memory system, according to an exemplary embodiment of the inventive concept.

FIG. 13 is an operation flowchart of a memory system, according to an exemplary embodiment of the inventive concept. The operation flowchart of FIG. 13 is similar to the operation flowchart of FIG. 12, except that temperature information is provided to a host in response to a normal read or write command. FIG. 13 illustrates an example in which an SSD device is used as a memory system, however, exemplary embodiments are not limited thereto.

Referring to FIG. 13, when the read or write command from the host is provided to the memory system, the memory system may provide the host with read data or a confirm command indicating that the write operation has been normally performed. The read data or the confirm command may be transmitted through a specific channel for data transmission and reception. A result of detecting the internal temperature of the memory system may be provided to the host through the same channel via which the read data and the confirm command are provided.

When the internal temperature of the memory system is in a normal temperature range, the memory system may operate at a normal performance level. Thereafter, when the internal temperature of the memory system increases and temperature information indicating the increase in temperature is provided to the host in response to a normal read or write command, the host may provide the memory system with performance setting information for throttling the performance level of the memory system. As the internal temperature of the memory system increases, the memory system may perform a throttling operation for lowering the performance level based on the performance setting information from the host.

Figure 14:
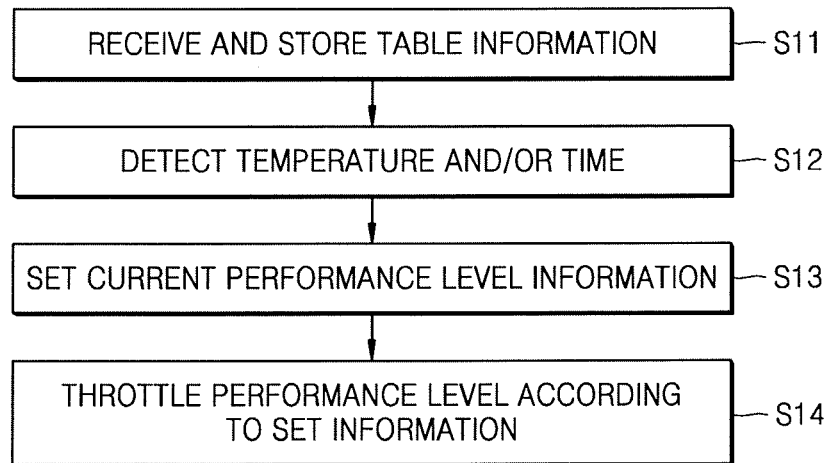
FIG. 14 is a flowchart showing a method of operating a memory system, according to an exemplary embodiment of the inventive concept.

FIG. 14 is a flowchart showing a method of operating a memory system, according to an exemplary embodiment of the inventive concept.

According to an exemplary embodiment of the inventive concept, an in-band command is used to transmit temperature information between a host and a memory system and/or throttle a performance level of the memory system. The memory system may automatically throttle the performance level according to a result of detecting an internal temperature of the memory system. In an initial operation of the memory system, the memory system receives table information, including temperature-dependent performance level information, from the host and stores the received table information (S11). The table information may include, for example, information relating to performance levels corresponding to a plurality of temperature ranges. For example, the table information may include a plurality of entries and include temperature range information and performance level information corresponding to the respective entries. As a temporal reference for throttling the performance level, time information corresponding to the respective entries may be further included in the table information.

The memory system may periodically or randomly detect an internal temperature of the memory system and detect an amount of time that the internal temperature is in a specific temperature range (S12). Detection of the amount of time that the internal temperature is in a specific temperature range may be performed using a timer. When the temperature information preset and stored in a predetermined memory (e.g., the current state storage unit described above) corresponds to a first temperature range and a relevant performance level corresponds to a first performance level, it may be detected whether the internal temperature of the memory system changes and moves into a second temperature range. The memory system may detect whether the current temperature remains in the second temperature range for a predetermined amount of time. When it is detected that the current temperature has remained in the second temperature range for the predetermined amount of time, the current temperature information may be updated in the memory. In addition, current performance level information may be set corresponding to the current temperature information updated in the memory (S13). The memory system may throttle the performance level of the memory system according to the set information (e.g., the performance level information) (S14).

Figure 15:
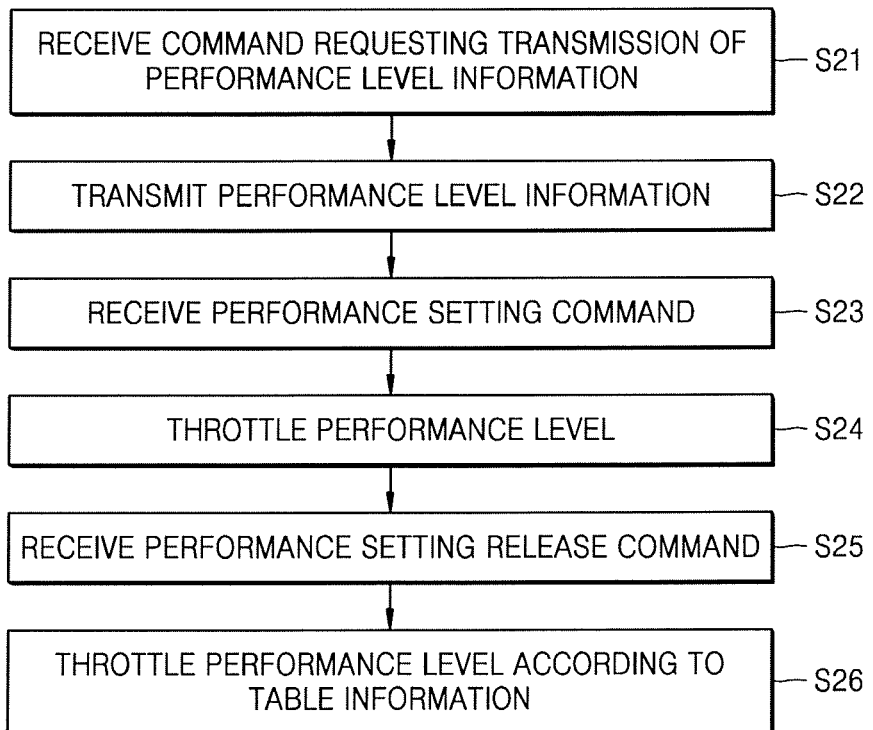
FIG. 15 is a flowchart showing a method of operating a memory system, according to an exemplary embodiment of the inventive concept.

FIG. 15 is a flowchart showing a method of operating a memory system, according to an exemplary embodiment of the inventive concept.

As described in the above-described exemplary embodiment, the memory system may receive table information from a host in an initial operation and store the received table information. In addition, the memory system may periodically or randomly detect an internal temperature of the memory system and throttle a performance level of the memory system according to a detection result. Therefore, a delay of a confirm command with respect to a command communicated between a host and the memory system may be adjusted. The host may refer to current performance level information of the memory system.

Therefore, the memory system may receive, from the host, a command requesting transmission of current performance level information (S21). The command requesting the transmission of the current performance level information may be, for example, a specific command that is prearranged between the host and the memory system. A normal command, such as a read or write command, may be used as described above.

In response to the request, the memory system may transmit current performance level information to the host (S22). The host may analyze the current performance level of the memory system and determine whether to throttle the performance level of the memory system. The host may transmit performance setting information for forcibly throttling the performance level of the memory system based on a determination result. The memory system may receive the performance setting information from the host (S23) and throttle the performance level of the memory system according to a command from the host (S24). The host may further provide the memory system with a command requesting the throttling of the performance level of the memory system along with the performance setting information.

In addition, the host may stop the operation of forcibly setting the performance level of the memory system. The memory system may receive a performance setting release command from the host (S25). According to the performance setting release command, the memory system may throttle the performance level of the memory system according to the result of periodically or randomly detecting the internal temperature, as described above. For example, the memory system may throttle the performance level based on the table information provided from the host in the initial operation of the memory system (S26).

Figure 16:
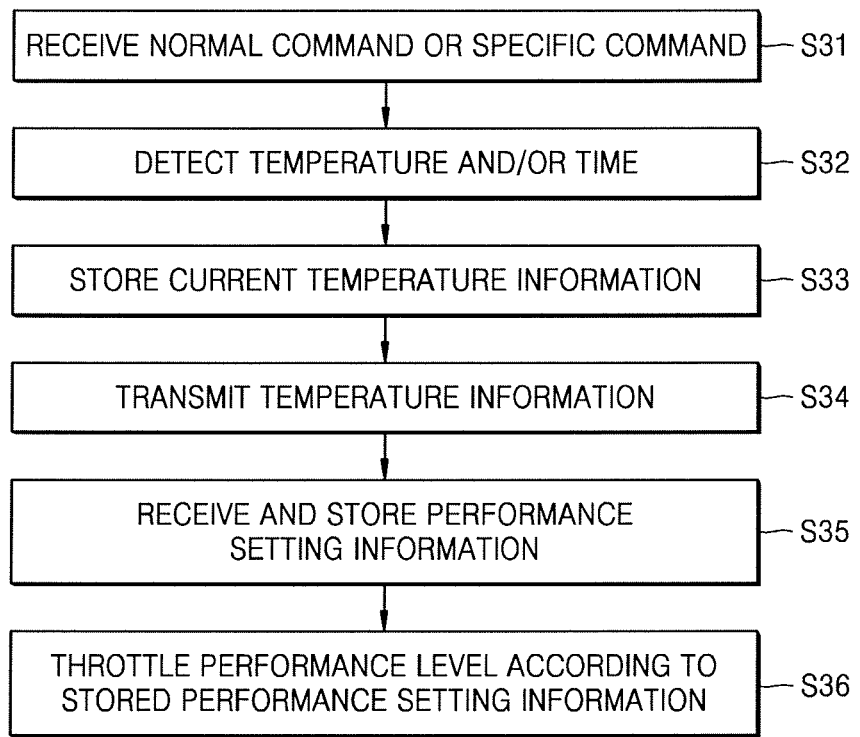
FIG. 16 is a flowchart showing a method of operating a memory system, according to an exemplary embodiment of the inventive concept.

FIG. 16 is a flowchart showing a method of operating a memory system, according to an exemplary embodiment of the inventive concept.

When a normal command or a specific command is received (S31), the memory system detects an internal temperature of the memory system and/or an amount of time in response to the command (S32). In addition, the memory system stores current temperature information in a predetermined memory of the memory system according to a detection result (S33). In this case, the detected temperature information is transmitted to the host (S34).

When the current temperature information is stored, it may be determined whether the current temperature remains in a predetermined range for a predetermined time by detecting a time (e.g., using a timer). When the current temperature is not maintained in the predetermined range for the predetermined time, the memory system may transmit existing temperature information stored in a memory to the host. Alternatively, when the current temperature remains in the predetermined range for the predetermined amount of time, current temperature information may be transmitted to the host.

The host may transmit, to the memory system, performance setting information for throttling the performance level of the memory system based on the temperature information received from the memory system. Therefore, the memory system may receive and store the performance setting information (S35) and throttle the performance level of the memory system according to the stored performance setting information (S36).

Figure 17:
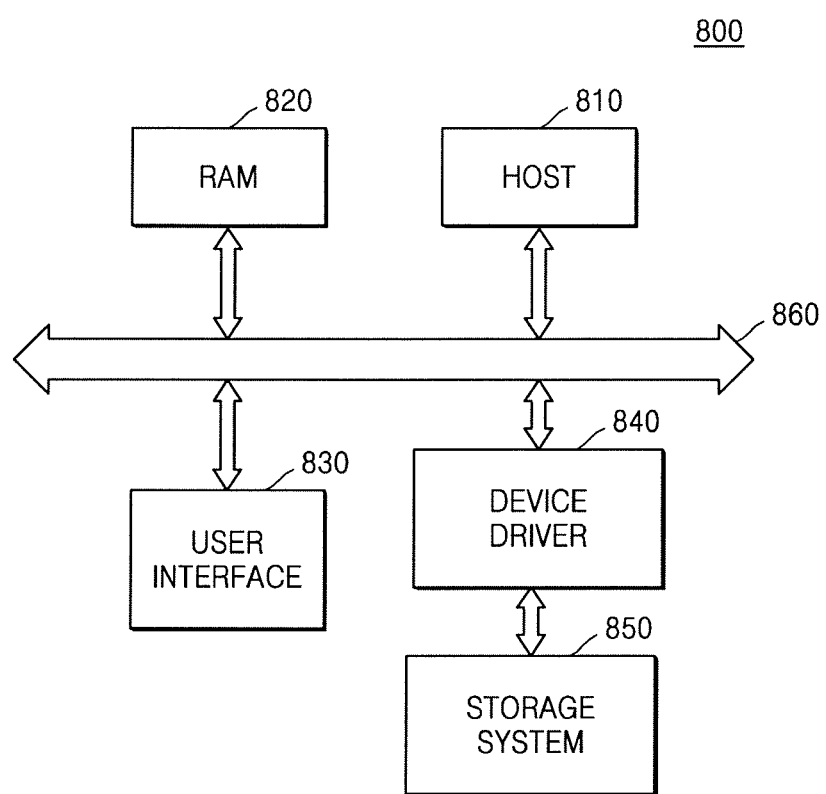
FIG. 17 is a block diagram of a computing system including a non-volatile memory system, according to an exemplary embodiment of the inventive concept.

FIG. 17 is a block diagram of a computing system 800 including a non-volatile memory system, according to an exemplary embodiment of the inventive concept. In the computing system 800, which may be, for example, a mobile device or a desktop computer, the non-volatile memory system may be mounted as a non-volatile storage system 850, however exemplary embodiments are not limited thereto.

The computing system 800 may include, for example, a host 810 including a CPU, a RAM 820, a user interface 830, and a device driver 840. These elements are electrically connected to a bus 860. The non-volatile storage system 850 may be connected to the device driver 840. The host 810 may control the entire computing system 800 and perform an operation corresponding to a user command input through the user interface 830. The RAM 820 may function as a data memory of the host 810. The host 810 may write user data to or read user data from the non-volatile storage system 850 through the device driver 840. In FIG. 17, the device driver 840 that controls the operation and management of the non-volatile storage system 850 is illustrated as being disposed outside the host 810, however exemplary embodiments are not limited thereto. For example, in an exemplary embodiment, the device driver 840 may be disposed inside the host 810.

As described with reference to the above-described exemplary embodiments, temperature information and table information may be transmitted and received between the host 810 and the non-volatile storage system 850. For example, in the initial operation of the computing system 800, the host 810 may transmit the table information to the non-volatile storage system 850. The non-volatile storage system 850 may store the table information, detect an internal temperature of the non-volatile storage system 850, and throttle the performance level based on the stored table information.

Figure 18:
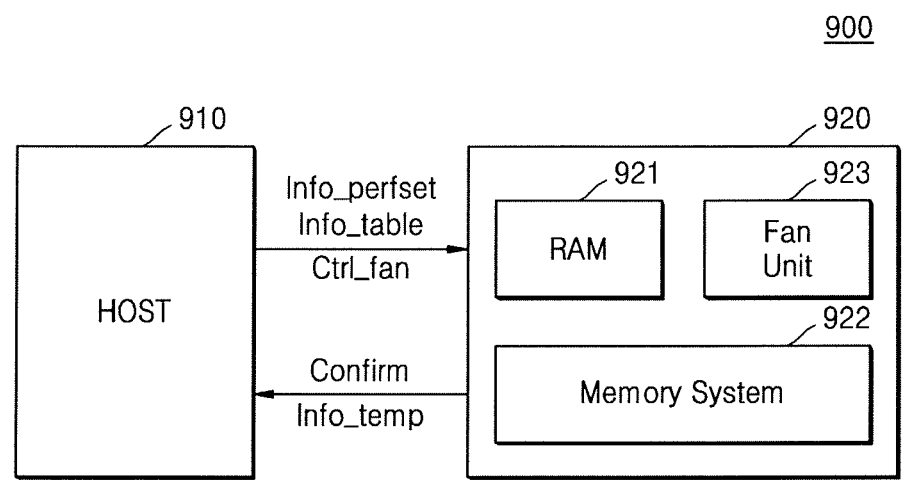
FIG. 18 is a block diagram of a computer system including a memory system, according to an exemplary embodiment of the inventive concept.

FIG. 18 is a block diagram of a computer system 900 including a memory system, according to an exemplary embodiment of the inventive concept.

Referring to FIG. 18, the computer system 900 may include, for example, a host 910 and a peripheral device(s) 920. The peripheral device(s) 920 may include, for example, a RAM 921 that operates as a main memory, a memory system 922 that is used as a storage device, and a fan unit 923 that adjusts an internal temperature of the computer system 900. The memory system according to exemplary embodiments of the inventive concept may be used to implement the RAM 921 and/or the memory system 922. The following description is made based on the assumption that the memory system according to exemplary embodiments of the inventive concept is used to implement the memory system 922 of FIG. 18.

As described above, the host 910 provides table information Info_table to the memory system 922 in the initial operation of the memory system 922, and the memory system 922 provides the host 910 with a confirm command as an adjustable performance level in response to various commands received from the host 910. In addition, the memory system 922 may provide the host 910 with temperature information Info_temp of the memory system 922 in response to a request from the host 910, and the host 910 may provide performance setting information Info_perfset to the memory system 922 for throttling the performance level of the memory system 922.

To adjust the internal temperature of the computer system 900, various devices of the computer system 900 may be controlled by the host 910. For example, a rotational speed of the fan unit 923 may be adjusted by controlling the fan unit 923 of the computer system 900, and the internal temperature of the computer system 900 may be adjusted by the adjusted rotational speed of the fan unit 923. The host 910 may generate a control signal Ctrl_fan for controlling the fan unit 923 and provide the control signal Ctrl_fan to the computer system 900. It is to be understood that exemplary embodiments are not limited to the use of a fan to adjust the internal temperature of the computer system 900.

Figure 19A:
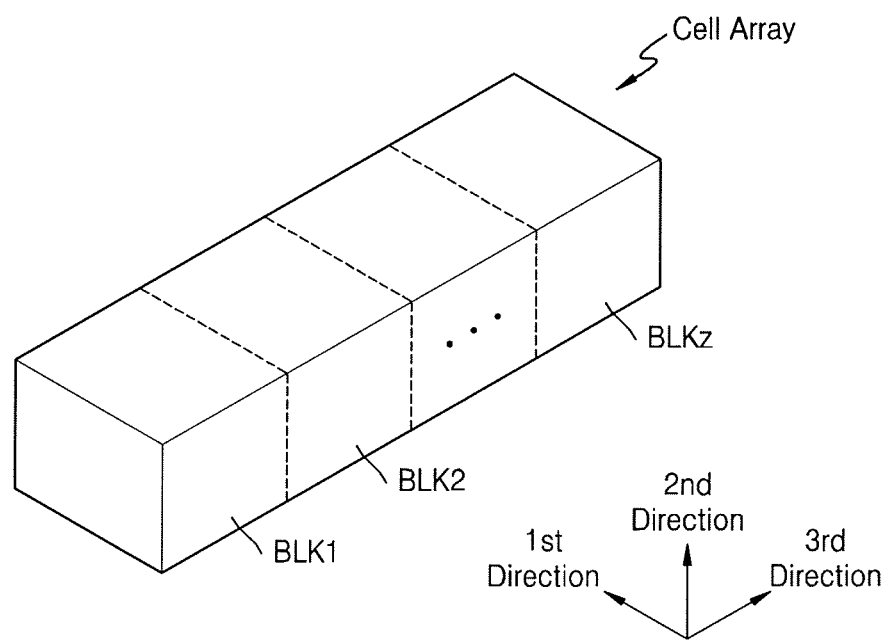
FIGS. 19A and 19B are diagrams illustrating an example in which a memory system according to an exemplary embodiment of the inventive concept is implemented using a three-dimensional NAND flash memory.
Figure 19B:
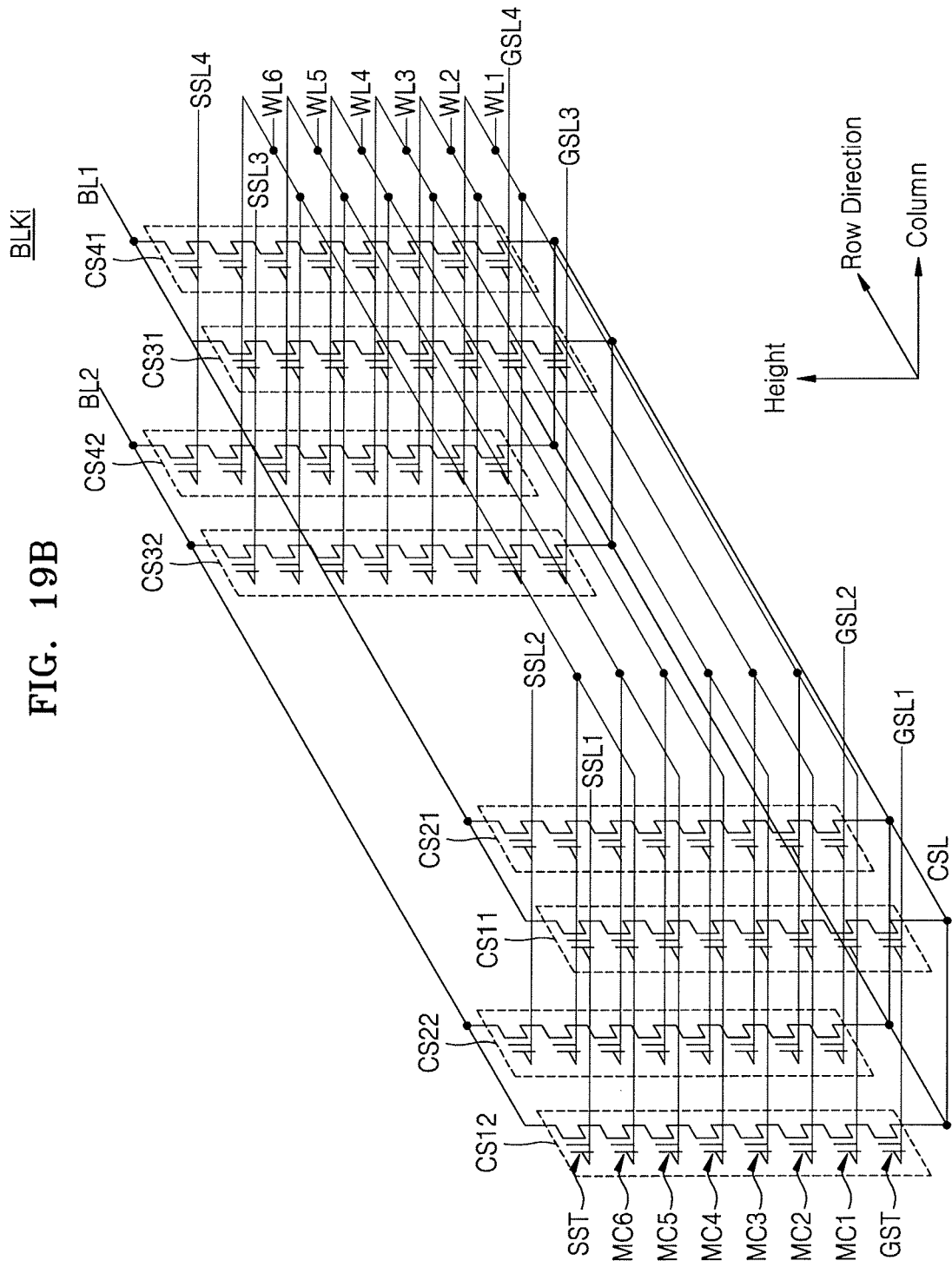

FIGS. 19A and 19B illustrate an example in which a memory system according to an exemplary embodiment of the inventive concept is implemented using a three-dimensional NAND flash memory. The three-dimensional flash memory may include three-dimensional (e.g., vertical) NAND (e.g., VNAND) memory cells. An implementation of a memory cell array including three-dimensional memory cells is described below.

FIG. 19A is a block diagram of a memory cell array included in a memory system, according to an exemplary embodiment of the inventive concept. Referring to FIG. 19A, the memory cell array includes a plurality of blocks BLK1 to BLKz. Each of the memory blocks BLK1 to BLKz has a three-dimensional structure (e.g., a vertical structure). For example, each of the memory blocks BLK1 to BLKz may include structures extending in first to third directions. For example, each of the memory blocks BLK1 to BLKz may include a plurality of NAND strings extending in the second direction. The plurality of NAND strings may be provided, for example, in the first to third directions.

Each of the NAND strings is connected to a bit line BL, a string select line SSL, a ground select line GSL, word lines WL, and a common source line CSL. That is, each of the memory blocks BLK1 to BLKz may be connected to a plurality of bit lines BL, a plurality of string select lines SSL, a plurality of ground select lines GSL, a plurality of word lines WL, and a common source line CSL. The memory blocks BLK1 to BLKz will be described in further detail below with reference to FIG. 19B.

FIG. 19B is a circuit diagram of a memory block BLKi according to an exemplary embodiment of the inventive concept. FIG. 19B illustrates an example of one of the memory blocks BLK1 to BLKz in the memory cell array of FIG. 19A.

The memory block BLKi may include a plurality of cell strings CS11 to CS41 and CS12 to CS42. The plurality of cell strings CS11 to CS41 and CS12 to CS42 may be arranged in column and row directions to form columns and rows. Each of the cell strings CS11 to CS41 and CS12 to CS42 may include a ground select transistor GST, memory cells MC1 to MC6, and a string select transistor SST. The ground select transistor GST, the memory cells MC1 to MC6, and the string select transistor SST, which are included in each of the cell strings CS11 to CS41 and CS12 to CS42, may be stacked in a height direction substantially perpendicular to a substrate.

The columns of the plurality of cell strings CS11 to CS41 and CS12 to CS42 may be connected to different string select lines SSL1 to SSL4, respectively. For example, the string select transistors SST of the cell strings CS11 and CS12 may be commonly connected to the string select line SSL1. The string select transistors SST of the cell strings CS11 and CS12 may be commonly connected to the string select line SSL2. The string select transistors SST of the cell strings CS31 and CS32 may be commonly connected to the string select line SSL3. The string select transistors SST of the cell strings CS41 and CS42 may be commonly connected to the string select line SSL4.

The rows of the plurality of cell strings CS11 to CS41 and CS12 to CS42 may be connected to different bit lines BL1 and BL2, respectively. For example, the string select transistors SST of the cell strings CS11 to CS41 may be commonly connected to the bit line BL1. The string select transistors SST of the cell strings CS12 to CS42 may be commonly connected to the bit line BL2.

The columns of the plurality of cell strings CS11 to CS41 and CS12 to CS42 may be connected to different ground select lines GSL1 to GSL4, respectively. For example, the ground select transistors GST of the cell strings CS11 and CS12 may be commonly connected to the ground select line GSL1. The ground select transistors GST of the cell strings CS21 and CS22 may be commonly connected to the ground select line GSL2. The ground select transistors GST of the cell strings CS31 and CS32 may be commonly connected to the ground select line GSL3. The ground select transistors GST of the cell strings CS41 and CS42 may be commonly connected to the ground select line GSL4.

The memory cells disposed at the same height from the substrate (or the ground select transistors GST) may be commonly connected to a single word line, and the memory cells disposed at different heights from the substrate may be connected to different word lines WL1 to WL6, respectively. For example, the memory cells MC1 may be commonly connected to the word line WL1. The memory cells MC2 may be commonly connected to the word line WL2. The memory cells MC3 may be commonly connected to the word line WL3. The memory cells MC4 may be commonly connected to the word line WL4. The memory cells MC5 may be commonly connected to the word line WL5. The memory cells MC6 may be commonly connected to the word line WL6. The ground select transistors GST of the cell strings CS11 to CS41 and CS12 to CS42 may be commonly connected to the common source line CSL.

Figure 20:
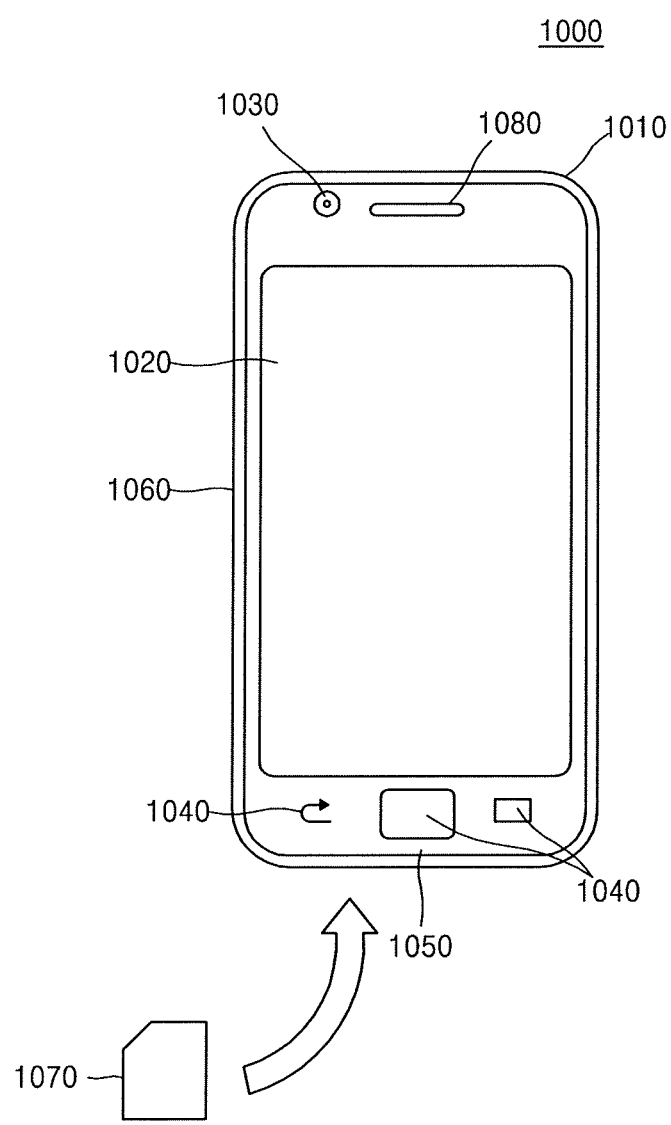
FIG. 20 is a diagram illustrating an example of a mobile terminal including a host and a non-volatile memory system, according to an exemplary embodiment of the inventive concept.

FIG. 20 is a diagram illustrating an example of a mobile terminal including a host and a non-volatile memory system, according to an exemplary embodiment of the inventive concept. The mobile terminal 1000 may be a smartphone, the functions of which are not restricted and are changeable or extendable through application programs. The mobile terminal 1000 may include an antenna 1010 that exchanges RF signals with a wireless base station, and a display screen 1020 that displays images captured by a camera 1030 or images received by the antenna 1010. Examples of the display screen 1020 include a liquid crystal display (LCD) screen and an organic light emitting diode (OLED) screen, however the display screen 1020 is not limited thereto. The mobile terminal 1000 may include an operation panel 1040 having, for example, a control button and a touch panel. When the display screen 1020 is a touch screen, the operation panel 1040 may further include a touch sensitive panel of the display screen 1020. The mobile terminal 1000 may include a sound output unit and a sound input unit. For example, the sound output unit may include a speaker 1080, and the sound input unit may include a microphone 1050. The mobile terminal 1000 may further include the camera 1030, which may be, for example, a charge coupled device (CCD) camera that captures video and still images. In addition, the mobile terminal 1000 may include a storage medium 1070 and a slot 1060 for receiving the storage medium 1070. The storage medium 1070 may store encoded or decoded data, such as video or still images captured by the camera, received via an e-mail, or acquired through another method. The storage medium 1070 may be mounted in the mobile terminal 1000 through the slot 1060. The storage medium 1070 may be, for example, a non-volatile memory system as described in the above exemplary embodiments. For example, the storage medium 1070 may be a different type of a flash memory, such as an SD card, an eMMC card, an UFS, or an electrically erasable and programmable read only memory (EEPROM) embedded in a plastic case.

While the inventive concept has been particularly shown and described with reference to the exemplary embodiments thereof, it will be understood that various changes in form and detail may be made therein without departing from the spirit and scope of the following claims.

What is claimed is:

1. A solid-state device comprising:
a plurality of three-dimensional NAND flash memory chips each including a memory cell array including three-dimensional memory cells; and
a memory controller configured to:
receive temperature information including a plurality of entries through an NVMe protocol from a host, the plurality of entries including a first entry and a second entry, wherein the first entry includes a first temperature defined by the host and first temperature-dependent performance level information defined by the host and corresponding to the first temperature, and the second entry includes a second temperature defined by the host and second temperature-dependent performance level information defined by the host and corresponding to the second temperature, wherein the second temperature is greater than the first temperature;
detect an internal temperature of the solid-state device;
perform a first throttling operation to cause the solid-state device to operate at a first performance level corresponding to the first temperature-dependent performance level information defined by the host when the detected internal temperature becomes greater than the first temperature and remains lower than the second temperature as the internal temperature increases; and
perform a second throttling operation to cause the solid-state device to operate at a second performance level corresponding to the second temperature-dependent performance level information defined by the host that is less than the first performance level when the detected internal temperature becomes greater than the second temperature as the internal temperature increases,
wherein the memory controller is further configured to automatically perform the first throttling operation and the second throttling operation based on the detected internal temperature and a determination of the temperature information in an entry corresponding to the detected internal temperature among the plurality of entries received from the host without intervention from the host,
wherein the second performance level has a level that causes the internal temperature to be lowered below the second temperature included in the second entry, and
wherein the first and second performance levels are less than a normal performance level.

2. The solid-state device of claim 1, wherein the memory controller is further configured to provide the internal temperature to the host in response to a request from the host.

3. The solid-state device of claim 1, wherein the temperature information is received from the host during a boot-up operation of the solid-state device or a run-time operation of the solid-state device.

4. The solid-state device of claim 3, wherein the temperature information is updated in a volatile memory in the solid-state device when the boot-up operation of the solid state device is performed.

5. The solid-state device of claim 1, wherein the controller is further configured to store the temperature information in a volatile memory in the solid-state device.

6. The solid-state device of claim 1, wherein the controller is further configured to store the temperature information in a non-volatile memory in the solid-state device.

7. The solid-state device of claim 1, wherein a frequency of an internal clock of the solid-state device is changed based on the detected temperature.

8. The solid-state device of claim 1, wherein a delay of a first confirm command corresponding to a first command received from the host is changed based on the detected temperature.

9. The solid-state device of claim 1, wherein a number of three-dimensional NAND flash memory chips to be simultaneously accessed from among the plurality of three-dimensional NAND flash memory chips is changed based on the detected temperature.

10. A method of operating a solid-state device, the solid-state device including a memory controller and a plurality of three-dimensional NAND flash memory chips each including a memory cell array including three-dimensional memory cells, the method comprising:
   receiving temperature information including a plurality of entries through an NVMe protocol from a host, the plurality of entries including a first entry and a second entry, wherein the first entry includes a first temperature defined by the host and first temperature-dependent performance level information defined by the host and corresponding to the first temperature, and the second entry includes a second temperature defined by the host and second temperature-dependent performance level information defined by the host and corresponding to the second temperature, wherein the second temperature is greater than the first temperature;
   detecting an internal temperature of the solid-state device;
   performing a first throttling operation to cause the solid-state device to operate at a first performance level corresponding to the first temperature-dependent performance level information defined by the host when the detected internal temperature becomes greater than the first temperature and remains lower than the second temperature as the internal temperature increases; and
   performing a second throttling operation to cause the solid-state device to operate at a second performance level corresponding to the second temperature-dependent performance level information defined by the host that is less than the first performance level when the detected internal temperature becomes greater than the second temperature as the internal temperature increases,
   wherein the memory controller is further configured to automatically perform the first throttling operation and the second throttling operation based on the detected internal temperature and according to the temperature information received from the host without intervention from the host,
   wherein the second performance level has a level that causes the internal temperature to be lowered below the second temperature included in the second entry, and
   wherein the first and second performance levels are less than a normal performance level.

11. The method of claim 10, further comprising:
providing the internal temperature to the host in response to a request from the host.

12. The method of claim 10, further comprising:
receiving the temperature information from the host during a boot-up operation of the solid-state device or a run-time operation of the solid-state device.

13. The method of claim 12, further comprising:
updating the temperature information in a volatile memory in the solid-state device when the boot-up operation of the solid-state device is performed.

14. The method of claim 10, further comprising:
storing the temperature information in a volatile memory in the solid-state device.

15. The method of claim 10, further comprising:
storing the temperature information in a non-volatile memory in the solid-state device.

16. The method of claim 10, further comprising:
changing a frequency of an internal clock of the solid-state device based on the detected temperature.

17. The method of claim 10, further comprising:
changing a delay of a first confirm command corresponding to a first command received from the host based on the detected temperature.

18. The method of claim 10, further comprising:
changing a number of three-dimensional NAND flash memory chips to be simultaneously accessed from among the plurality of three-dimensional NAND flash memory chips based on the detected temperature.

* * * * *